United States Patent
Beaver et al.

(10) Patent No.: US 11,822,888 B2
(45) Date of Patent: Nov. 21, 2023

(54) IDENTIFYING RELATIONAL SEGMENTS

(71) Applicant: Verint Americas Inc., Alpharetta, GA (US)

(72) Inventors: Ian Beaver, Spokane, WA (US); Cynthia Freeman, Albuquerque, NM (US); Andrew T. Pham, Modesto, CA (US)

(73) Assignee: Verint Americas Inc., Alpharetta, GA (US)

( * ) Notice: Subject to any disclaimer, the term of this patent is extended or adjusted under 35 U.S.C. 154(b) by 157 days.

(21) Appl. No.: 16/546,941

(22) Filed: Aug. 21, 2019

(65) Prior Publication Data
US 2020/0110805 A1 Apr. 9, 2020

Related U.S. Application Data

(60) Provisional application No. 62/741,610, filed on Oct. 5, 2018.

(51) Int. Cl.
| | |
|---|---|
| *G06F 40/30* | (2020.01) |
| *G06F 40/274* | (2020.01) |
| *G06F 3/04817* | (2022.01) |
| *G06F 3/0482* | (2013.01) |
| *H04L 67/131* | (2022.01) |
| *H04L 67/1001* | (2022.01) |
| *G10L 15/22* | (2006.01) |

(Continued)

(52) U.S. Cl.
CPC ............ *G06F 40/30* (2020.01); *G06F 3/0482* (2013.01); *G06F 3/04817* (2013.01); *G06F 40/274* (2020.01); *G10L 15/22* (2013.01); *H04L 67/1001* (2022.05); *H04L 67/131* (2022.05); *G06F 16/90335* (2019.01); *G10L 15/30* (2013.01); *G10L 15/32* (2013.01); *G10L 2015/226* (2013.01)

(58) Field of Classification Search
CPC .... G06F 40/30; G06F 40/274; G06F 3/04817; G06F 3/0482; G06F 16/90335; H04L 29/08144; H04L 67/1002; H04L 67/38; H04L 67/1001; H04L 67/131; G10L 2015/226; G10L 15/32; G10L 15/30; G10L 15/22
USPC ............................................. 704/9
See application file for complete search history.

(56) References Cited

U.S. PATENT DOCUMENTS

| | | |
|---|---|---|
| 5,730,603 A | 3/1998 | Harless |
| 5,761,687 A | 6/1998 | Hon et al. |

(Continued)

OTHER PUBLICATIONS

Ballantyne, D., "Dialogue and its role in the development of relationship specific knowledge," Journal of Business & Industrial Marketing, vol. 19, No. 2, 2004, pp. 114-123.

(Continued)

*Primary Examiner* — Dino Kujundzic
*Assistant Examiner* — Jianmei F Duckworth
(74) *Attorney, Agent, or Firm* — Meunier Carlin & Curfman LLC

(57) ABSTRACT

Features, libraries, and techniques are provided herein for determining the kinds of relational language that are present. Applying audio, emojis, and sentiment shifts as features may be used to determine whether the customer is providing backstory, whether there is ranting, etc. Textual features may be considered, as well as audio features may be considered.

20 Claims, 15 Drawing Sheets

(51) Int. Cl.
*G06F 16/903* (2019.01)
*G10L 15/30* (2013.01)
*G10L 15/32* (2013.01)

(56) References Cited

U.S. PATENT DOCUMENTS

| | | | |
|---|---|---|---|
| 5,918,222 A * | 6/1999 | Fukui | G06Q 10/10 |
| 5,999,904 A | 12/1999 | Brown et al. | |
| 6,097,442 A | 8/2000 | Rumreich et al. | |
| 6,305,942 B1 | 10/2001 | Block et al. | |
| 6,556,970 B1 | 4/2003 | Sasaki et al. | |
| 6,847,931 B2 | 1/2005 | Addison et al. | |
| 6,925,455 B2 | 8/2005 | Gong et al. | |
| 7,149,687 B1 | 12/2006 | Gorin et al. | |
| 7,155,391 B2 | 12/2006 | Taylor | |
| 7,487,094 B1 | 2/2009 | Konig et al. | |
| 7,590,224 B1 | 9/2009 | Gorin et al. | |
| 8,086,462 B1 | 12/2011 | Alonso et al. | |
| 8,086,549 B2 | 12/2011 | Qi et al. | |
| 8,311,863 B1 | 11/2012 | Kemp | |
| 8,340,971 B1 | 12/2012 | Abella et al. | |
| 8,543,398 B1 | 9/2013 | Strope et al. | |
| 8,554,559 B1 | 10/2013 | Aleksic et al. | |
| 8,571,859 B1 | 10/2013 | Aleksic et al. | |
| 8,600,747 B2 | 12/2013 | Abella et al. | |
| 8,605,885 B1 | 12/2013 | Wooters | |
| 8,805,684 B1 | 8/2014 | Aleksic et al. | |
| 8,843,372 B1 | 9/2014 | Isenberg | |
| 8,880,398 B1 | 11/2014 | Aleksic et al. | |
| 9,123,333 B2 | 9/2015 | Amarilli et al. | |
| 9,202,461 B2 | 12/2015 | Biadsy et al. | |
| 9,460,722 B2 | 10/2016 | Sidi et al. | |
| 9,503,579 B2 | 11/2016 | Watson et al. | |
| 9,508,346 B2 | 11/2016 | Achituv | |
| 9,563,622 B1 | 2/2017 | Anderson | |
| 9,715,875 B2 | 7/2017 | Piernot et al. | |
| 10,170,116 B1 | 1/2019 | Kelly et al. | |
| 10,878,047 B1 * | 12/2020 | Mutagi | G06F 40/00 |
| 10,909,124 B2 | 2/2021 | Lim et al. | |
| 2002/0062342 A1 | 5/2002 | Sidles | |
| 2002/0152262 A1 | 10/2002 | Arkin et al. | |
| 2003/0046123 A1 | 3/2003 | Chen | |
| 2003/0055640 A1 | 3/2003 | Burshtein et al. | |
| 2003/0115056 A1 | 6/2003 | Gusler et al. | |
| 2003/0167195 A1 | 9/2003 | Fernandes et al. | |
| 2003/0191627 A1 | 10/2003 | Au | |
| 2004/0249650 A1 | 12/2004 | Freedman et al. | |
| 2004/0264677 A1 | 12/2004 | Horvitz et al. | |
| 2005/0060574 A1 | 3/2005 | Klotz et al. | |
| 2005/0080628 A1 | 4/2005 | Kuperstein | |
| 2005/0097507 A1 | 5/2005 | White et al. | |
| 2005/0117729 A1 | 6/2005 | Reding et al. | |
| 2006/0080130 A1 | 4/2006 | Choksi | |
| 2007/0005369 A1 | 1/2007 | Potter | |
| 2007/0011012 A1 | 1/2007 | Yurick et al. | |
| 2007/0071212 A1 | 3/2007 | Quittek et al. | |
| 2007/0083359 A1 * | 4/2007 | Bender | G06F 40/58 704/9 |
| 2007/0100790 A1 | 5/2007 | Cheyer et al. | |
| 2008/0012701 A1 | 1/2008 | Kass et al. | |
| 2008/0062890 A1 | 3/2008 | Temple | |
| 2008/0086690 A1 | 4/2008 | Verma et al. | |
| 2008/0091423 A1 | 4/2008 | Roy | |
| 2008/0221882 A1 | 9/2008 | Bundock | |
| 2008/0240374 A1 | 10/2008 | Conway et al. | |
| 2008/0252780 A1 | 10/2008 | Polumbus et al. | |
| 2009/0012970 A1 | 1/2009 | Ziv et al. | |
| 2009/0103709 A1 | 4/2009 | Conway et al. | |
| 2009/0193011 A1 | 7/2009 | Blair-Goldenshohn et al. | |
| 2009/0193328 A1 | 7/2009 | Reis et al. | |
| 2009/0222395 A1 | 9/2009 | Light et al. | |
| 2009/0224867 A1 | 9/2009 | O'Shaughnessy | |
| 2009/0240652 A1 | 9/2009 | Su et al. | |
| 2009/0290689 A1 | 11/2009 | Watanabe et al. | |
| 2010/0104087 A1 | 4/2010 | Byrd et al. | |
| 2010/0131274 A1 | 5/2010 | Stent et al. | |
| 2010/0332287 A1 | 12/2010 | Gates et al. | |
| 2011/0069822 A1 | 3/2011 | Jan et al. | |
| 2011/0206198 A1 | 8/2011 | Freedman et al. | |
| 2011/0267419 A1 | 11/2011 | Quinn et al. | |
| 2012/0254917 A1 | 10/2012 | Burkitt et al. | |
| 2012/0310629 A1 | 12/2012 | Stewart et al. | |
| 2013/0018824 A1 | 1/2013 | Ghani et al. | |
| 2013/0103399 A1 | 4/2013 | Gammon | |
| 2013/0173254 A1 | 7/2013 | Alemi | |
| 2013/0282682 A1 | 10/2013 | Batraski et al. | |
| 2013/0283168 A1 * | 10/2013 | Brown | G06F 3/165 715/728 |
| 2013/0297216 A1 | 11/2013 | Hirst et al. | |
| 2013/0300939 A1 | 11/2013 | Chou et al. | |
| 2014/0067375 A1 | 3/2014 | Wooters | |
| 2014/0074454 A1 * | 3/2014 | Brown | G10L 15/08 704/9 |
| 2014/0142940 A1 | 5/2014 | Ziv et al. | |
| 2014/0142944 A1 | 5/2014 | Ziv et al. | |
| 2014/0222419 A1 | 8/2014 | Romano et al. | |
| 2014/0222476 A1 | 8/2014 | Romano | |
| 2014/0297268 A1 | 10/2014 | Govrin et al. | |
| 2015/0025887 A1 | 1/2015 | Sidi et al. | |
| 2015/0066502 A1 | 3/2015 | Achituv et al. | |
| 2015/0066503 A1 | 3/2015 | Achituv et al. | |
| 2015/0112981 A1 | 4/2015 | Conti et al. | |
| 2015/0286627 A1 | 10/2015 | Chang et al. | |
| 2015/0348549 A1 | 12/2015 | Giuli et al. | |
| 2016/0217792 A1 | 7/2016 | Gorodetski et al. | |
| 2016/0217793 A1 | 7/2016 | Gorodetski et al. | |
| 2016/0350426 A1 | 12/2016 | Wu et al. | |
| 2017/0053653 A1 | 2/2017 | Sidi et al. | |
| 2017/0060996 A1 | 3/2017 | Das | |
| 2017/0068670 A1 | 3/2017 | Orr et al. | |
| 2017/0160813 A1 * | 6/2017 | Divakaran | G06K 9/00335 |
| 2017/0220677 A1 | 8/2017 | Kazi et al. | |
| 2018/0060326 A1 | 3/2018 | Kuo et al. | |
| 2018/0101533 A1 | 4/2018 | Robichaud | |
| 2018/0114337 A1 | 4/2018 | Li et al. | |
| 2018/0330721 A1 | 11/2018 | Thomson et al. | |
| 2019/0103102 A1 * | 4/2019 | Tseretopoulos | H04L 51/02 |
| 2019/0354594 A1 * | 11/2019 | Foster | G06F 40/35 |
| 2020/0019641 A1 * | 1/2020 | Tonetti | G10L 13/06 |

OTHER PUBLICATIONS

Bhaskar, J., et al., "Hybrid Approach for Emotion Classification of Audio Conversation Based on Text and Speech Mining," International Conference on Information and Communication Technologies (ICICT 2014), Procedia Computer Science, vol. 46, 2015, pp. 635-643.

Bickmore, T., et al., "Relational Agents: A Model and Implementation of Building User Trust," Proceedings of the SIGCHI Conference on Human Factors in Computing Systems (CHI '01), ACM, 2001, pp. 396-403.

Burge, J., Emojipedia, retrieved on Nov. 12, 2019 at https://blog.emojipedia.org/author/jeremyburge.com, 2013, 2 pages.

Casale, et al., et al. "Speech Emotion Classification using Machine Learning Algorithms," The International Conference on Semantic Computing, IEEE Computer Society, 2008, pp. 158-165.

Chai, J.Y., et al., "Towards Conversational QA: Automatic Identification of Problematic Situations and User Intent," Proceedings of the COLING/ACL 2006 Main Conference Poster Sessions, Association for Computational Linguistics, 2006, pp. 57-64.

Coppola, N.W. et al., "Building Trust in Virtual Teams," IEEE Transactions on Professional Communication, vol. 47, No. 2, 2004, pp. 95-104.

De Visser, E.J., et al., "Almost Human: Anthropomorphism Increases Trust Resilience in Cognitive Agents," Journal of Experimental Psychology: Applied, 2016, 19 pages.

Farías, D.I.H., et al., "ValenTo: Sentiment Analysis of Fgurative Language Tweets with Irony and Sarcasm," Proceedings of the 9th International Workshop on Semantic Evaluation, 2015, pp. 694-698.

Felbo, B., et al., "Using millions of emoji occurrences to learn any-domain representations for detecting sentiment, emotion and

(56) References Cited

OTHER PUBLICATIONS sarcasm," Proceedings of the 2017 Conference on Empirical Methods in Natural Language Processing (EMNLP), 2017, 13 pages.
Holton, J.A., "Building trust and collaboration in a virtual team," Team Performance Management: An International Journal, vol. 7, Nos. 3 and 4, 2001, pp. 36-47.
Kim, B., et al., "Two-stage multi-intent detection for spoken language understanding," Multimedia Tools and Applications, 2016, 14 pages.
Laflen, A., et al., "Okay, My Rant is Over": The Language of Emotion in Computer-Mediated Communication, Computers and Composition, vol. 29, No. 4, 2012, pp. 296-308.
Lee, M.K., et al., "Receptionist or Information Kiosk: How Do People Talk With a Robot?," Proceedings of the 2010 ACM conference on Computer Supported Cooperative Work, ACM, 2010, 10 pages.
Loria, S., et al., "TextBlob: Simplified Text Processing," Release 0.15.2, retrieved on Nov. 12, 2019 at https://textblob.readthedocs.io/en/dev, 2014, 3 pages.
Levy, S., "Alexa, Tell Me Where You're Going Next," Backchannel.com, available online at https://www.wired.com/2016/11/alexa-tell-me-where-youre-going-next/, 2016, 8 pages.
Sarikaya, R., et al., "An Overview of End-To-End Language Understanding and Dialog Management for Personal Digital Assistants," IEEE Workshop on Spoken Language Technology, 2016, pp. 391-397.
Shen, P., et al., "Automatic Speech Emotion Recognition Using Support Vector Machine," 2011 International Conference on Electronic and Mechanical Engineering and Information Technology (EMEIT 2011), vol. 1, pp. 1-538.
Ververidis, D., et al., "Emotional speech recognition: Resources, features, and methods," Speech Communication, vol. 48, 2016, pp. 1162-1181.
Xu, P., et al., "Exploiting Shared Information for Multi-intent Natural Language Sentence Classification," Interspeech, 2013, pp. 3785-3789.
Beaver, I., et al., "An Annotated Corpus of Relational Strategies in Customer Service," arXiv.org, Cornell University Library, XP080953431, 2017, 19 pages.
Search Report, dated Nov. 27, 2019, received in connection with corresponding EP Patent Application No. 19201334.0.
Freeman, C., et al., "Online Proactive Escalation in Multi-Modal Automated Assistants," Proceedings of the Thirtieth International Florida Artificial Intelligence Research Society Conference, 2017, pp. 215-220.
Freeman, C., "Paying Attention to Attention: Highlighting Influential Samples in Sequential Analysis," Arxiv.org, Cornell University Library, 2018, 10 pages.
Levenshtein, V.I., "Binary Codes Capable of Correcting Deletions, Insertions, and Reversals," Soviet Physics-Doklady, vol. 10, No. 8, 1966, pp. 707-710.
Martens, D., et al., "Explaining Data-Driven Document Classifications," MIS Quarterly, 2014, 54 pages.
Ribeiro, M., et al., "Why Should I Trust You? Explaining the Predictions of Any Classifier," Proceedings of the 22nd ACM SIGKDD International Conference on Knowledge Discovery and Data Mining, 2016, pp. 1135-1144.
Viterbi, A.J., "Error Bounds for Convolutional Codes and an Asymptotically Optimum Decoding Algorithm," IEEE Transactions on Information Theory, vol. 13, No. 2, 1967, pp. 260-269.
Xu, H., et al., "Minimum Bayes Risk decoding and system combination based on a recursion for edit distance," Computer Speech & Language, vol. 25, Issue 4, 2011, pp. 802-828.
Yang, Z., et al., "Hierarchical Attention Networks for Document Classification," Proceedings of NAACL-HLT 2016, San Diego, Jun. 12-17, 2016, pp. 1480-1489.

\* cited by examiner

IDENTIFYING RELATIONAL SEGMENTS

CROSS-REFERENCE TO RELATED APPLICATIONS

This application claims the benefit of priority to U.S. Provisional Patent Application No. 62/741,610, filed on Oct. 5, 2018, entitled "Introduction of Features for Identifying Relational Segments," the contents of which are hereby incorporated by reference in its entirety.

BACKGROUND

To better assist humans, Intelligent Virtual Assistant (IVA) designers strive to support human-like interactions. As IVAs become more human-like, users increasingly use relational strategies (e.g., self-exposure and justification) with IVAs similar to conversing with humans. To build trust with the agent, customers may establish credibility through small talk, self-exposure, and by providing justification of their requests.

In interactive question answering, such as dialogs with an IVA, understanding user intention or intent is essential for the success of the IVA. The intent can be determined as the interpretation of a user input that allows an agent to formulate the best response. However, when relational strategies are applied to IVAs, the additional language introduced is often unnecessary and can even obfuscate user intent. Such language can lead to confusion in the IVA and a degradation of user experience in the form of clarification questions and wrong information. A need continues to exist in the art of intelligent virtual assistants for ways to assess the relevance of portions of a user's input before using computerized methodologies to generate the virtual assistant output. By using only relevant portions of the input from a user, unnecessary background information that may be submitted by the user could be ignored.

SUMMARY

Features, libraries, and techniques are provided herein for determining the kinds of relational language that are present. Applying audio, emojis, and sentiment shifts as features may be used to determine whether the customer is providing backstory, whether there is ranting, etc. Textual features may be considered, as well as audio features may be considered.

In an implementation, a system comprises a computing device at a service provider configured to receive input from a user device of a user while the user is engaged in a session on a site of the service provider, determine a secondary intent of the input, classify the second intent into at least one category of relational language, and generate a response based on the secondary intent; and a virtual-assistant configured to interact with the user.

In an implementation, a method comprises receiving input at a computing device of a service provider from a user device of a user while the user is engaged in a session on a site of a service provider; determining a secondary intent of the input; classifying the second intent into at least one category of relational language; and generating a response based on the secondary intent.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
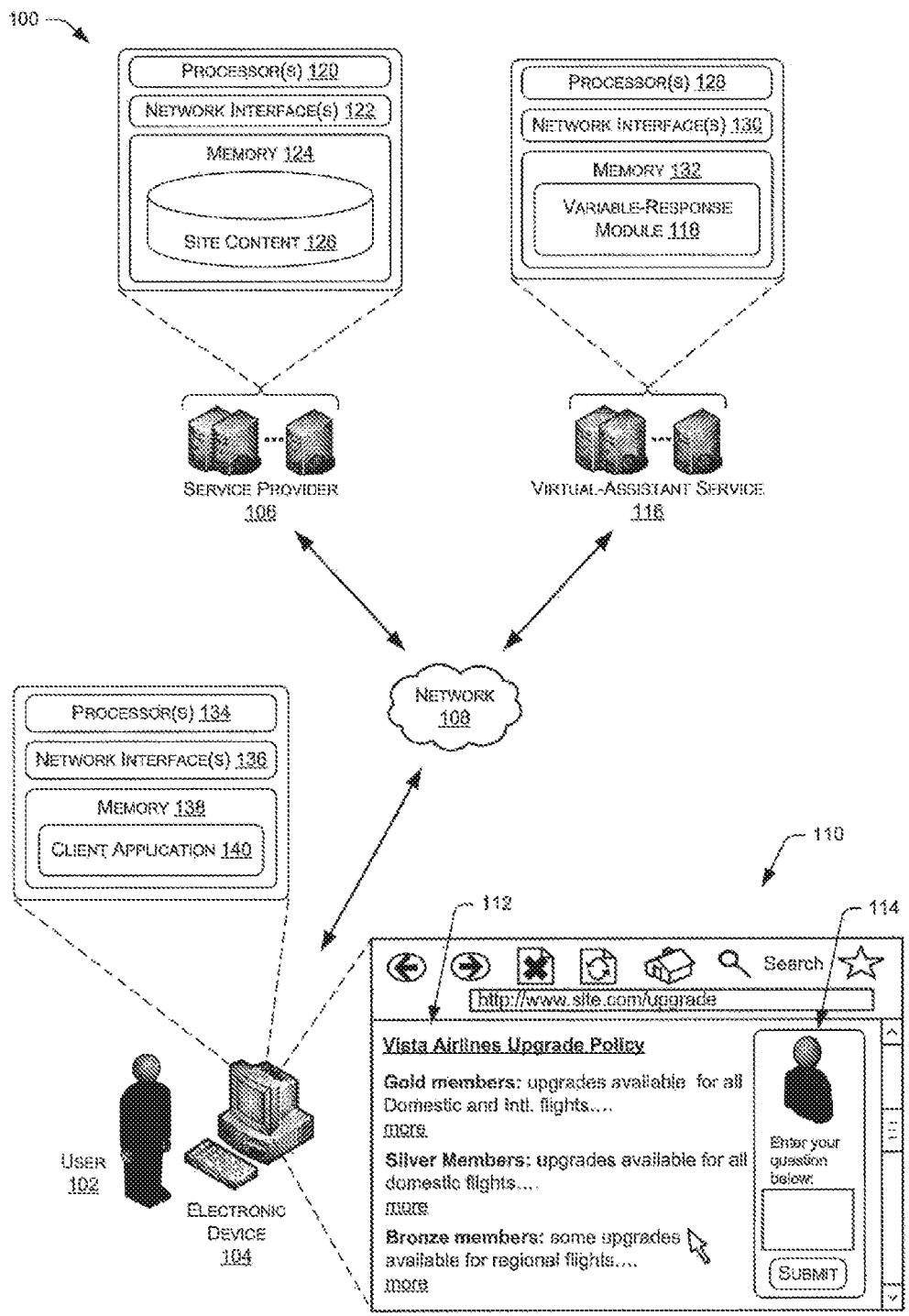
FIG. 1 is an illustration of an exemplary environment for identifying relational segments.

Natural language input data described herein may take any form sufficient to be converted into a computer or software based machine language for processing. As such, the inputs to an intelligent virtual assistant may include written, typed, oral, audio, gestures, or any communication form.

A user may navigate to a site of a service provider that includes a virtual assistant, either on the site or adjacent to the site. The virtual assistant may include an avatar that resembles a human representative of the service provider (e.g., that represents a human face). In addition, the virtual assistant may include an input mechanism, such as a text box, in which a user may input a query. In some instances, the user may type the query, while in other instances the user may issue the query audibly or in any other manner. In either case, the query may comprise a question (e.g., "Can I upgrade my seat assignment on my next flight?") or may simply comprise one or more keywords or a phrase (e.g., "seat assignment upgrades").

In response to receiving the query, the techniques parse the query and utilize natural language processing techniques to identify one or more concepts expressed therein. In one example, the concepts may be based at least in part on keywords within the query, although the concepts may additionally be determined using other processes such as those described herein.

A response provided back to a user may include content and/or action(s). For instance, a response may include content such as a textual answer or information, an audible answer or information, one or more hyperlinks to pages that have been determined to be related to the query, or the like. In some instances, the techniques may provide some or all of this response via the virtual assistant. For instance, the returned content may include text and one or more links that are written as a narrative from the perspective of the virtual assistant. This content may also be addressed to or otherwise tailored to the particular user, if recognized (e.g., "Yes, John, as a Gold Customer you are entitled to a seat upgrade, and I have provided some links below that may be of interest to you . . . .") In addition or in the alternative, the techniques may provide information audibly that appears to originate from the virtual assistant.

Additional or alternatively, the techniques may perform an action on behalf of the user in response to receiving the query, such as causing a user's electronic device to navigate to a page deemed related to the query (e.g., to a page associated with Gold Customer upgrade policies), may alter a reservation or order on behalf of the user (e.g., upgrade the user's seat assignment), may initiate a request on behalf of the user (e.g., request the upgrade), may initiate a communication on behalf of the user, may purchase an item on behalf of the user, or may perform any other similar or different type of action in response to receiving the query.

By taking into account the context of a query both: (1) for the purposes of identifying an intent, and (2) after for the purposes of identifying a response identifying the intent, the techniques described herein allow for interaction between virtual assistants and end users that more closely mirror human-to-human interactions. These techniques are described below with reference to an example architecture. It is to be appreciated, however, that other similar and/or different architectures may also implement these techniques.

FIG. 1 is an illustration of an exemplary environment for identifying relational segments. More particularly, FIG. 1 illustrates an example architecture 100 that includes a user 102 operating an electronic device 104 to render content from a site of a service provider 106 (e.g., a website, a client application, etc.). The architecture also includes a virtual-assistant service 116 that provides a virtual assistant for rendering on or adjacent to the site of the service provider, with this virtual assistant configured to provide variable responses to user queries. These responses may be determined, in part, by mapping a query to an intent based on a context of the query and by mapping the intent to a response, again with reference to the context of the query.

The site may comprise a website, an intranet site, a downloaded application, or any other platform on which the user 102 may access information from the service provider 106. In this example, the user 102 access the site over a network 108, which may represent any type of communication network, including a local area network, a wide area network, the Internet, a wireless network, a wireless wide-area network (WWAN), a cable television network, a telephone network, a cellular communications network, combinations of the foregoing, and/or the like.

As illustrated, the device 104 renders a user interface (UI) 110 that includes content 112 from the service provider 106 and content 114 from a virtual-assistant service 116. In some instances, the content 114 may be served from servers of the service provider 106 as part of the site, while in other instances the content 114 may be from servers of the virtual-assistant service 116 served atop or adjacent to the site. In either instance, the content 112 of the site may include any sort of details or information associated with the service provider 106, while the content 114 may include a virtual assistant (e.g., an avatar that resembles a human representative of the service provider 106) along with an interface that allows the user 102 to enter a query to the virtual assistant.

As described in further detail below, the user 102 may enter a query into the interface provided by the virtual assistant. In response to receiving this query either from the computing device 104, from the service provider 106, or in some other manner, a variable-response module 118 of the virtual-assistant service 116 may identify a response to provide to the user 102 at least partly via the virtual assistant. For instance, the variable-response module 118 may map the query to an intent based on a context of the query and may then map the intent to a response, again with reference to the context of the query. After identifying the response, the virtual-assistant service 116 and/or the service provider 106 may provide the response to the user 102.

As illustrated, the service provider 106 may comprise one or more computing devices (e.g., one or more servers) that include or otherwise have access to one or more processors 120, one or more network interfaces 122, and memory 124, which stores content 126 of the site of the service provider 106. The virtual-assistant service 116, meanwhile, may also comprise one or more computing devices (e.g., one or more servers) that include or otherwise have access to one or more processors 128, one or more network interfaces 130, and memory 132, which stores the variable-response module 118.

The electronic device 104 of the user 102 may include or otherwise have access to one or more processors 134, one or more network interfaces 136, and memory 138, which stores a client application 140 for rendering the UI 110. The client application may comprise a browser for rendering the site content 126, a downloaded application provided by the service provider 106, or any other client application configured to output content from the service provider 106. While FIG. 1 illustrates the service provider 106 storing the site content 126, in some instances the client application 140 may store some or all of this content locally on the device 104.

Figure 11:
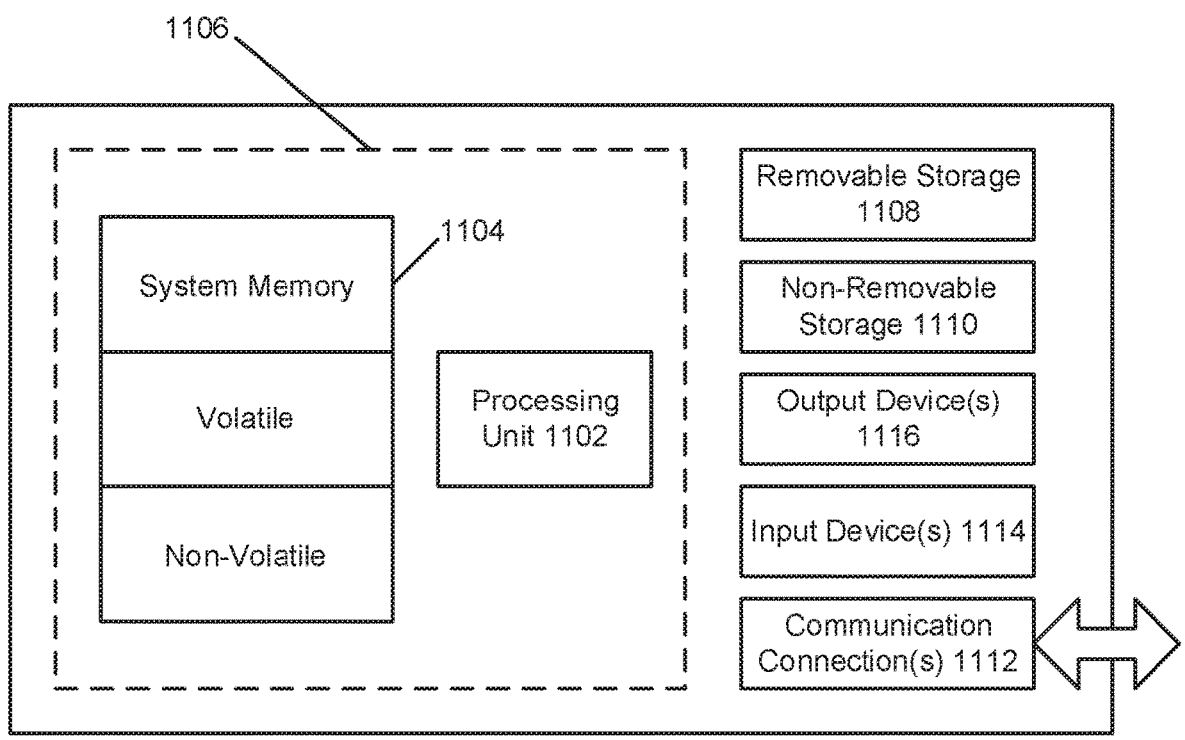
FIG. 11 shows an exemplary computing environment in which example embodiments and aspects may be implemented.

Furthermore, while FIG. 1 illustrates the electronic device 104 as a desktop computer, the electronic device 104 may comprise any sort of device, such as a mobile phone, a multifunctional device, a laptop computer, a personal digital assistant (PDA), or the like. In each instance, the electronic device 104 may include various additional components, such as one or more output devices (e.g., displays, speakers, etc.), one or more input devices (e.g., a keyboard, a touchscreen, etc.), an operating system, system busses, and the like. The electronic device 104 may be implemented using a variety of computing devices such as smartphones, desktop computers, laptop computers, tablets, set top boxes, vehicle navigation systems, and video game consoles. Other types of computing devices may be supported. A suitable computing device is illustrated in FIG. 11 as the computing device 1100.

The memory 138 (and other memories described herein) stores a number of modules and data, and may include volatile and/or nonvolatile memory, removable and/or non-removable media, and the like, which may be implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage, or other magnetic storage devices, RAID storage systems, or any other medium which can be used to store the desired information and which can be accessed by a computing device.

While FIG. 1 illustrates one example architecture for identifying relational segments, it is to be appreciated that multiple other architectures may implement the described techniques. For instance, while FIG. 1 illustrates the service provider 106 as separate from the virtual-assistant service 116, in some instances some or all of these components may reside in a common location, spread out amongst multiple additional entities, located on the electronic device 104, and/or the like.

Although only service provider 106, one virtual-assistant service 116, and one electronic device 104 are shown in FIG. 1, there is no limit to the number of service providers, virtual-assistant services, and electronic devices that may be supported.

The identification of relational strategies in a single conversational turn can be structured as a multi-intent detection problem. The user not only wants the task completed (the primary intent), but they may also attempt to build credibility or some common ground with the IVA (the secondary intent). Segments of text such as justification or backstory can be annotated as secondary intent and ignored while determining the primary intent. Once relational language is isolated, a separate classification can determine what relational strategies are in use and how to properly respond.

Multi-intent detection within dialog systems is still an emerging field; in recent work, only one intent is assumed to be present per turn. A few methods exist which use multi-label learning and/or which employ a two-stage intent detection strategy. However, in these conventional methods, multi-intent detection is assumed to be multiple task-oriented intents within a single turn. This disclosure is significantly different, at least in one way, in that secondary intents are relational in nature and therefore are detected and handled differently.

Figure 2:
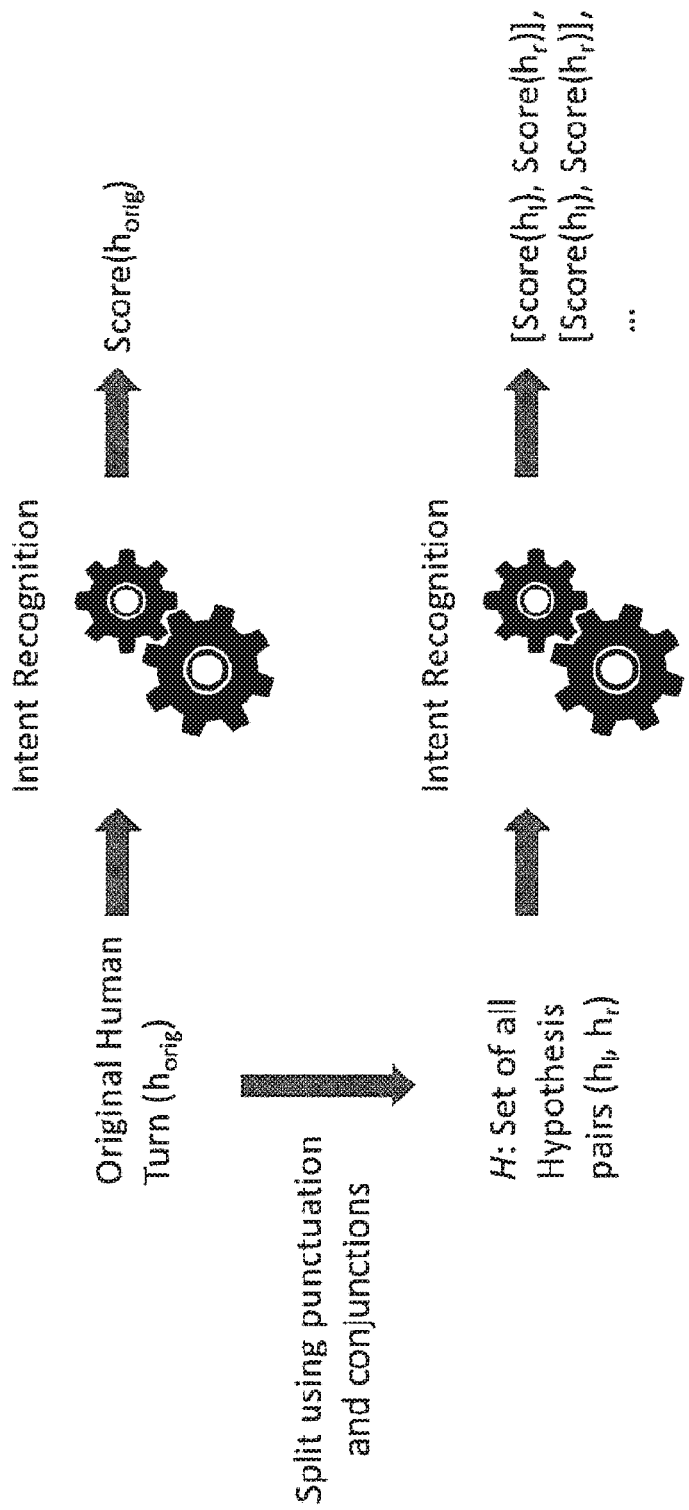
FIG. 2 illustrates an intent recognition model as set forth in the examples of this disclosure.

In one non-limiting embodiment, a partitioning strategy can be implemented for multi-intent detection that is extended to detect relational language and further process it. Although English is used in the following examples, this method can be applied to any language with common conjunctions and punctuation. As visualized in FIG. 2, this disclosure implements a set of segment identifiers in the form of language specific punctuation symbols combined with a dictionary of common language, specific conjunctions such as "and", "but", "because", "so that", and the like, to split each input turn on every occurrence of punctuation or conjunction and form the set of all possible hypothesis pairs (H), demonstrated in Example 1 below.

EXAMPLE 1

Original turn $h_{orig}$: My mother and I just returned from Florida and they lost our bags. Who do we contact?
Hypothesis pair 1: <My mother>, <I just returned from Florida and they lost our bags. Who do we contact>
Hypothesis pair 2: <My mother and I just returned from Florida><they lost our bags. Who do we contact>
Hypothesis pair 3: <My mother and I just returned from Florida and they lost our bags>, <Who do we contact>

The left and right segments, $h_L$ and $h_r$, from every pair $h \in H$ are then fed into the intent classifier independently, and the confidence score of classification on each is recorded. There are many approaches to determining a confidence score that are generally described as probabilities that a result is accurate.

U.S. Pat. No. 9,715,875 (Piernot 2017), which is incorporated herein by reference as if set forth fully below, describes at col. 8, lines 10-61 one non-limiting way to envision this probability problem and determining a confidence score. "In some examples, a probabilistic system can be used to determine whether or not the virtual assistant should respond to the spoken user input by determining a likelihood or confidence score that the user intended for the spoken user input to be directed at the virtual assistant. The probabilistic system can include a machine learning system or classifiers, such as neural networks. Additionally, the probabilistic system can learn and adapt to the user using a feedback loop. In these probabilistic system examples, the likelihood or confidence score can include a numerical or other representation of a calculated probability that the user intended for the spoken user input to be directed at the virtual assistant. The calculated likelihood or confidence score can then be compared to a threshold value to determine whether or not the virtual assistant should respond to the spoken user input. For example, if the calculated likelihood or confidence score is greater than the threshold value, it can be determined that the spoken user input was intended for the virtual assistant. If, however, the calculated likelihood or confidence score is not greater than the threshold value, it can be determined that the spoken user input was not intended for the virtual assistant. The likelihood or confidence score can be determined in any number of ways. For example, the determination can generally include summing positive, negative, and/or neutral contributions from any number of different types of contextual information. For example, the likelihood or confidence score can be calculated using the general formula of $P=C1+C2+C3+ \ldots +CN$, where P represents the likelihood or confidence score that the spoken user input was intended for the user device and $C1 \ldots CN$ can be positive, negative, or zero values representing the positive, negative, or neutral contributions to the likelihood or confidence score from the N different types of contextual information. A positive contribution can represent a type of contextual information that suggests that the spoken user input was intended for the virtual assistant, a negative contribution can represent a type of contextual information that suggests that the spoken user input was not intended for the virtual assistant, and a neutral contribution can represent a type of contextual information that is neutral regarding the likelihood that the spoken user input was intended for the virtual assistant. Thus, a large P value can indicate that the spoken user input was likely intended for the virtual assistant, while small or negative P values can indicate that the spoken user input was likely not intended for the virtual assistant. The weight or value that each contextual information contribution adds to the likelihood or confidence score determination can be uniform or non-uniform. Additionally, the weight or value that each contribution adds to the likelihood or confidence score determination can depend on the value of the particular type of contextual information. For example, if contribution C1 depends on the volume of the user's voice, the sign (e.g., +/−) and/or magnitude of C1 can depend on a numerical representation of the volume of the user's voice."

In another document, such as U.S. Pat. No. 10,170,116 (Kelly et al., 2019) incorporated by reference herein, the confidence score is discussed at column 11, lines 39-57. "The different ways a spoken utterance may be interpreted (i.e., the different hypotheses) may each be assigned a probability or other type of a confidence score representing the likelihood that a particular set of words matches those spoken in the utterance. The confidence score may be based on a number of factors including, for example, the similarity of the sound in the utterance to models for language sounds (e.g., an acoustic model 253 stored in an ASR Models Storage 252), and the likelihood that a particular word which matches the sounds would be included in the sentence at the specific location (e.g., using a language or grammar model). Thus each potential textual interpretation of the spoken utterance (hypothesis) is associated with a confidence score. Based on the considered factors and the assigned confidence score, the ASR process 250 outputs the most likely text data recognized in the audio data 211. The ASR process may also output multiple hypotheses in the form of a lattice or an N-best list with each hypothesis corresponding to a confidence score or other score (such as probability scores, etc.)."

For the purpose of multi-intent detection, the procedure determines if two separate intents are present by comparing the confidence scores for $h_L$ and hr to the score for $h_{orig}$ as shown in Equation 1. As noted, a previously calculated threshold for Equation 1 is stored in computerized memory to determine of an input has more than a single intent joined by partition identifiers such as punctuation marks and language-based conjunction words.

$$\frac{\min\{score(h_l), score(h_r)\}}{score(h_{orig})} > threshold_{multi-intent} \quad (1)$$

If Equation 1 holds, then there are two different intents present in the original input from a user's turn in the human-machine conversation. For this disclosure, this idea extends to partitioning the original turn into segments and using the intent classifier's confidence on each segment for detecting the presence of unnecessary language. If the model observes that either of the following equations hold, using the arbitrary scaling factor s<=0.75 (which is not limiting of the disclosure), the method concludes that $h_L$ (in Equation 2) or hr (in Equation 3) contains language that is unknown to the intent classifier and is therefore out of the expected scope for intent recognition. The upward pointed arrow symbol below is short hand for "the minimum compared to," whereas a downward pointed arrow (open at the top) would be interpreted as "the maximum compared to".

$$[score(h_L) < score(h_{orig}) \times s] \wedge [score(h_r) > score(h_{orig})] \quad (2)$$

$$[score(h_L) > score(h_{orig})] \wedge [score(h_r) < score(h_{orig}) \times s] \quad (3)$$

In common terms, Equation 2 starts with the premise that one works only with confidence scores on the left side segment of the input that are less than the confidence score of the original entire sentence adjusted by a scaling factor. The scaling factor ensures that the length of the input terms are generally comparable. In Equation 2, after determining the left side confidence scores at issue, then the algorithm selects the left side segments that are minimized as compared to those confidence scores for right side segments that are greater than the confidence score of the original sentence. In the scenarios of Equation 2, the left side segments are deemed non-essential or noisy portions that are not helpful in determining intent.

Equation 3 starts with the premise that one works only with confidence scores on the right side segment of the input that are less than the confidence score of the original entire sentence adjusted by a scaling factor. The scaling factor ensures that the length of the input terms are generally comparable. In Equation 3, after determining the right side confidence scores at issue, then the algorithm selects the right side segments that are minimized as compared to those confidence scores for left side segments that are greater than the confidence score of the original sentence. In the scenarios of Equation 3, the right side segments are deemed non-essential or noisy portions that are not helpful in determining intent.

EXAMPLE 2 score($h_{orig}$)=0.65

Hypothesis pair 1: confidence score($h_L$)=0.01, confidence score($h_r$)=0.7

Hypothesis pair 2: confidence score($h_L$)=0.1, confidence score($h_r$)=0.9

Hypothesis pair 3: confidence score($h_L$)=0.4, confidence score($h_r$)=0.5

Continuing from the previous example, in Example 2 these examples show that either Hypothesis pair 1 or 2 would satisfy Equation 2, but as Hypothesis pair 2 scored higher for hr, it would be selected. The segment "they lost our bags. Who do we contact" contains no unnecessary information to determine the user intent of <baggage_claims_contact_info>. Using hr as the primary task-oriented intent as it has the highest score, we proceed to determine the relational segment. Notice that although Equation 2 and Equation 3 assume exactly two segments, one can easily extend this idea to work with any number of segments if finer grained detection is desired. For example, to detect n segments of relational language, one can generate n equations of the for $$[(score(h_1) < score(h_{orig}) \times s) \wedge (score(h_2) < score(h_{orig}) \times s) \wedge \ldots] \wedge [score(h_n) > score(h_{orig})]$$

Once separated, relational sections are classified to determine the classes of relational language present. Any multi-class classification method can be used for this, such as a Support Vector Machine, Decision Tree, or Neural Network. Each relational section is evaluated and given one or more of the following tags:

Greeting, Backstory, Justification, Gratitude, Rant, Express Emotion, Other.

Greetings are a common relational strategy humans use to build rapport with other humans and machines.

Backstory is a method of self-exposure that may be employed by the customer.

For example, the customer may include the fact that he or she is attending a graduation as a means of self-exposure.

This may be an attempt to build common ground with the agent or it may indicate the importance of the trip and motivate the agent to help the customer succeed.

Justification is used by the customer to argue why the agent should take some action on the part of the customer. For instance, when trying to replace a defective product, a customer may explain how the product failed to establish credibility that the product was at fault.

Gratitude, like greetings, are used by humans to also build rapport with humans and machines.

Ranting is a means of expressing dissatisfaction when a customer feels frustrated, ignored, or misunderstood. In computer-mediated conversations, the non-verbal emotional cues present in face-to-face conversations are missing; thus, humans resort to such negative strategies to convey their emotions. For tagging purposes, define a Rant to encompass any excessive complaining or negative narrative.

Expressing emotions can be a means of showing displeasure when a customer feels a conversation is not making adequate progress or in reaction to an unexpected or disagreeable agent response. This can also indicate joking or other positive emotional expression. The tag Express Emotion is used as a catch-all for any emotional statement that is not covered by Rant. Examples would be: "i love that!", "UGH!", "WHY???".

The Other tag indicates that some or all of the section does not contain any relational language. This is commonly a restatement of the primary intent or facts that can be marked as unnecessary or out of application scope.

Figure 3:
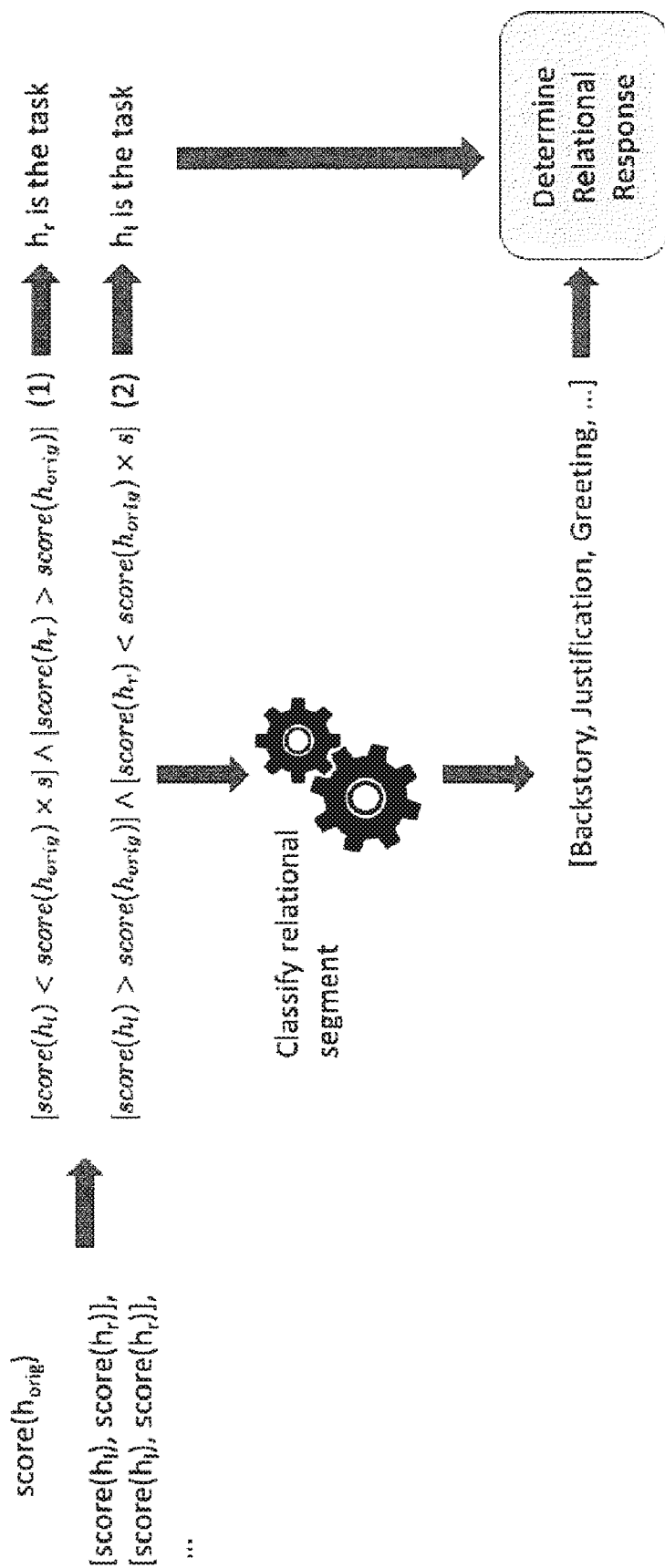
FIG. 3 illustrates an intent recognition model as set forth in the examples of this disclosure.

Once the relational section(s) have been isolated and classified, the IVA can then determine the appropriate action to take based on the task-oriented intent. Given the task, a second component can determine how to respond to the relational classes present. This process is visualized in FIG. 3. For example, if a user is complaining as evidenced by the Ranting class, the IVA can include an apology in its response along with the appropriate action to complete the task. If Justification is present, the IVA can reciprocate by indicating understanding on the importance of the task, while also performing or responding to the primary task-oriented intent.

If the relational segments do not in fact include relational language, as evidenced by the Other class, they can be ignored as out of application scope. The separation of such language will still increase accuracy in determining the correct task-oriented intent for a given human conversational turn.

As described above, language often contains a primary intent and a secondary intent. Based on the secondary intents, one can determine the kinds of relational language present. Relational language includes any kind of language that a person may use to try to establish credibility and build trust with a customer service representative for example. As noted above, example classes of relational language include: greetings, backstory, justification, gratitude, and ranting. These are not inclusive as more or fewer classes of relational language may be used depending on the desired emotional response of the IVA. Separating relational language (i.e., secondary intent) from the main intention (i.e., primary intent) is important because the IVA or service provider can then take appropriate action. For example, if the customer is expressing anger, it would make sense for the IVA or service provider to apologize and use empathetic language.

Features, libraries, and techniques are provided herein for determining the kinds of relational language that are present. Applying audio, emojis, and sentiment shifts as features may be used to determine whether the customer is providing backstory, whether there is ranting, etc. Textual features may be considered, as well as audio features may be considered.

Conventionally, only textual features are considered and not audio features, as text is the lowest common denominator of input. However, with access to audio, as described herein, a wide set of features may be used in determining relational segments. Extensive literature exists on emotion classification from speech. An angry person is very likely to have high mean and variance in the pitch of voice, whereas a person who is disgusted or bored usually has lower pitch values. A sad person tends to have a slower speech rate; this is reflected in the frequency of the audio signal.

As a result, pitch, energy, and frequency features are extracted from audio to detect emotions in speech. The energy, pitch, and frequency features of linear prediction cepstrum coefficients (LPCC), Mel frequency cepstrum coefficients (MFCC), linear prediction coefficients and Mel cepstrum coefficients (LPCMCC) may be extracted from speech samples and used to distinguish between the emotional states of disgust, boredom, sadness, and happiness.

Audio features are used detecting the relational classes of ranting which encompasses excessive complaining and negative narrative as well as expressing emotions which is used as a catch-all for emotional statements not covered by rants. For example, ranting may be covered by features that capture anger.

Emojis can be used. Emojis often serve as a proxy for the sentiment of a text. There are almost 3,000 emojis in the Unicode Standard as of June 2018. With the increased use of emojis, it is a valuable feature for determining relational segments.

Emojis may be used to classify the emotional context of text. An LSTM model can be applied to multiple NLP tasks besides sentiment analysis such as sarcasm detection. Known models exist that can be used for associating emojis to emotions.

Sentiment shifts can be used. Analyzing the sentiment of text can be a useful feature for determining the relational segment. Python's TextBlob is a library built on NLTK (the Natural Language Toolkit) that can return the polarity (which ranges from −1 to 1) of a string. For example, "The food was awesome!" would get a polarity value of 1, indicating positive sentiment whereas "I hate that movie. It was horrible!!!" would get a polarity of −1 (which would suggest ranting is occurring). "The food was pretty good" might get a polarity of 0.7 which is not as strongly positive as the first example, but positive nevertheless. A strongly positive or negative polarity for a user turn would provide evidence for the relational segment of expressing emotion.

Analyzing how polarity shifts during a conversation is another feature that can be used to determine the relational segment. For example, if a conversation begins with negative polarity and ends with positive polarity, that might indicate that the IVA has helped the customer achieve a satisfactory outcome; the customer has a higher likelihood of thanking the IVA as a result. The relational segment of gratitude might be detected in this instance. If the reverse happens where a conversation's polarity begins positively or neutrally (polarity near 0) but ends negatively, the customer probably had a bad experience and ranting has a higher chance of occurrence. Sudden polarity shifts are also a sign for sarcasm (e.g. expressing positive sentiment at a negative situation).

Figure 4:
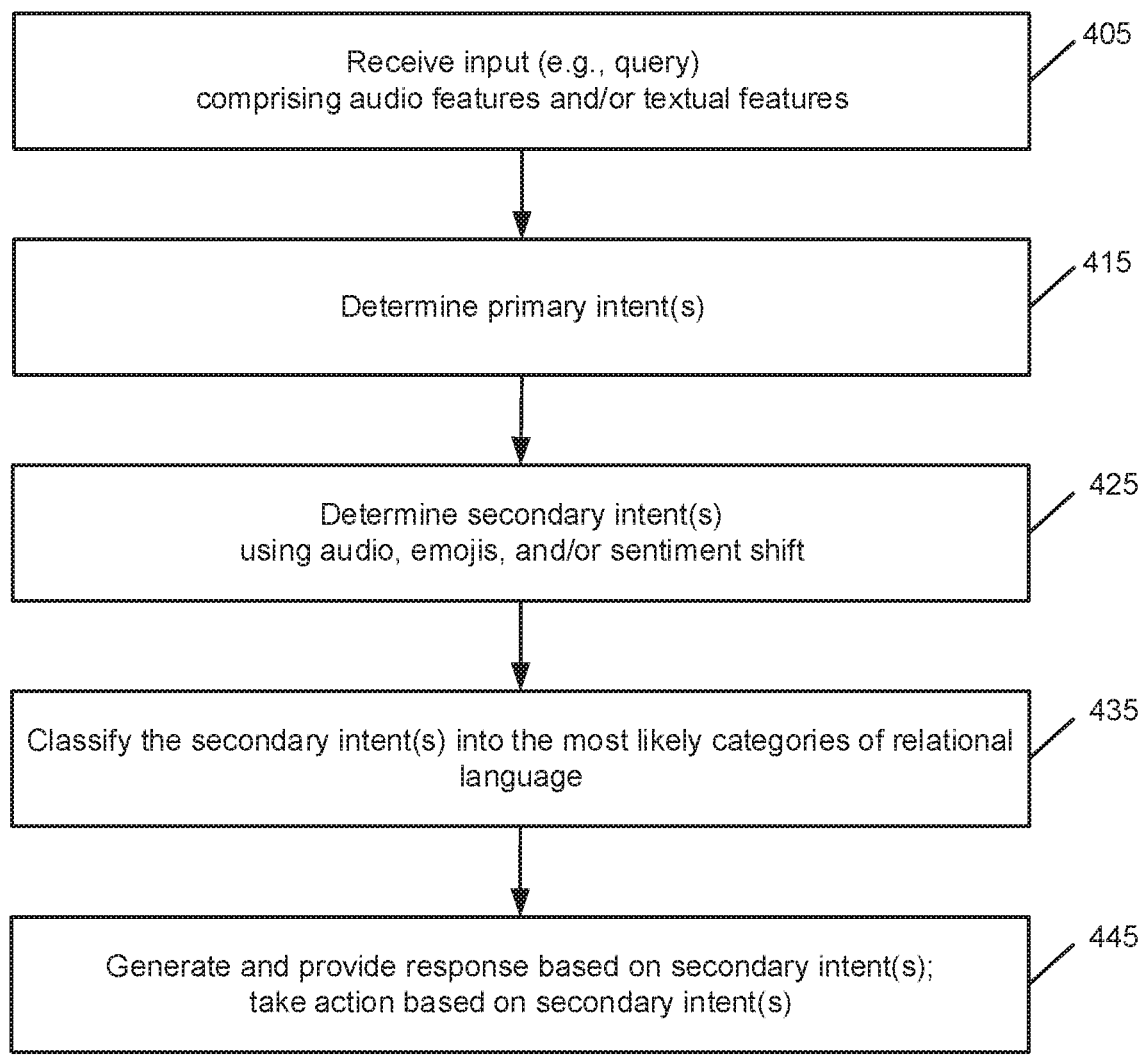
FIG. 4 is an operational flow of an implementation of a method for identifying relational segments.

FIG. 4 is an operational flow of an implementation of a method 400 for identifying relational segments.

At 405, input (e.g., a query) comprising audio features and/or textual features is received. The input may comprise language that is spoken and/or written, for example. The input may be received from (i.e., originating from) a human such as a customer or customer service representative. The input may be received at a computing device (e.g., of the service provider 106 or the virtual-assistant service 116, in some implementations).

At 415, the computing device, using the techniques described herein, determines the primary intent(s) (e.g., the business intent(s)). At 425, using the techniques described herein, the computing device determines the secondary intent(s) (e.g., the non-business intent(s)). In some implementations, the secondary intent(s) may be determined using at least one of audio, emojis, and/or sentiment shift.

At 435, the secondary intents are classified into the most likely categories of relational language so that the IVA can craft its response appropriately. Therefore, using the above mentioned features, such a classification task can be more accurately performed. For example, if a user is talking to an IVA over an audio channel and says "I don't need anything else but thanks for trying", the methods described herein can be used to provide the two segments: "I don't need anything else" containing the primary (business) intent and "thanks for trying" containing a secondary (non-business) intent. In order to determine the class of the secondary intent, look at the corresponding audio features within the speech segment containing it. If the audio features indicate that the way the segment was delivered indicates sarcasm, it can be labeled as a sarcastic segment. If instead, the tone is pleasant as the segment was delivered, it can be labeled as gratitude.

At 445, a response is generated and provided (e.g., by the IVA) based on the classified secondary intent(s). In this manner, action is taken based on the secondary intent(s).

By considering such features beyond just the contents of the text itself, more accurate relational classification can be performed, greatly increasing the relational abilities of IVAs. Therefore, by application of audio, sentiment shifts, and presence and interpretation of emojis to textual content, a more accurate determination of relational class for a given segment is achieved, thereby increasing the relational abilities of IVAs.

Figure 5A:
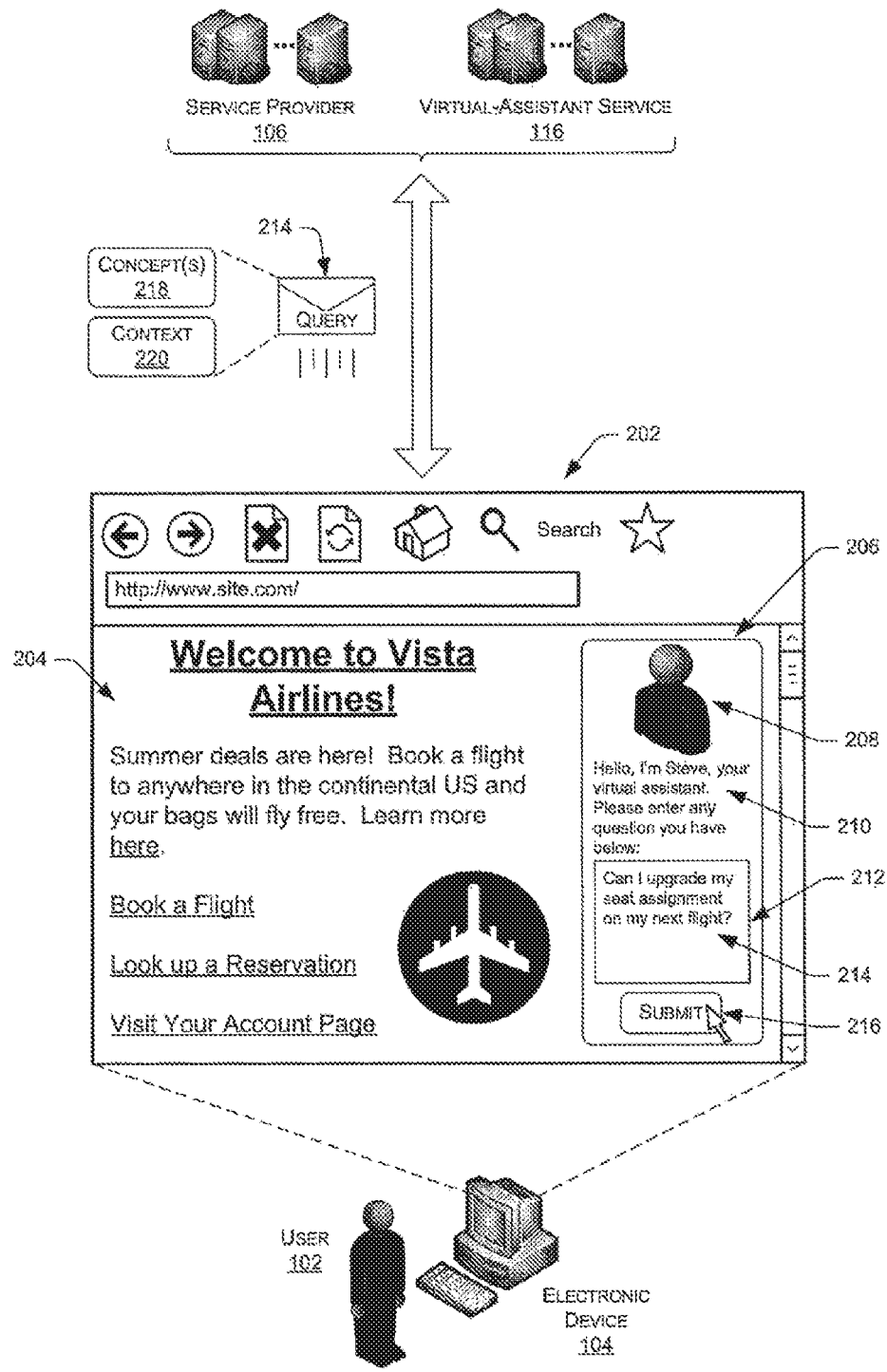
FIG. 5A illustrates a high-level communication flow between an electronic device of the user and the service provider and/or the virtual-assistant service.
Figure 5B:
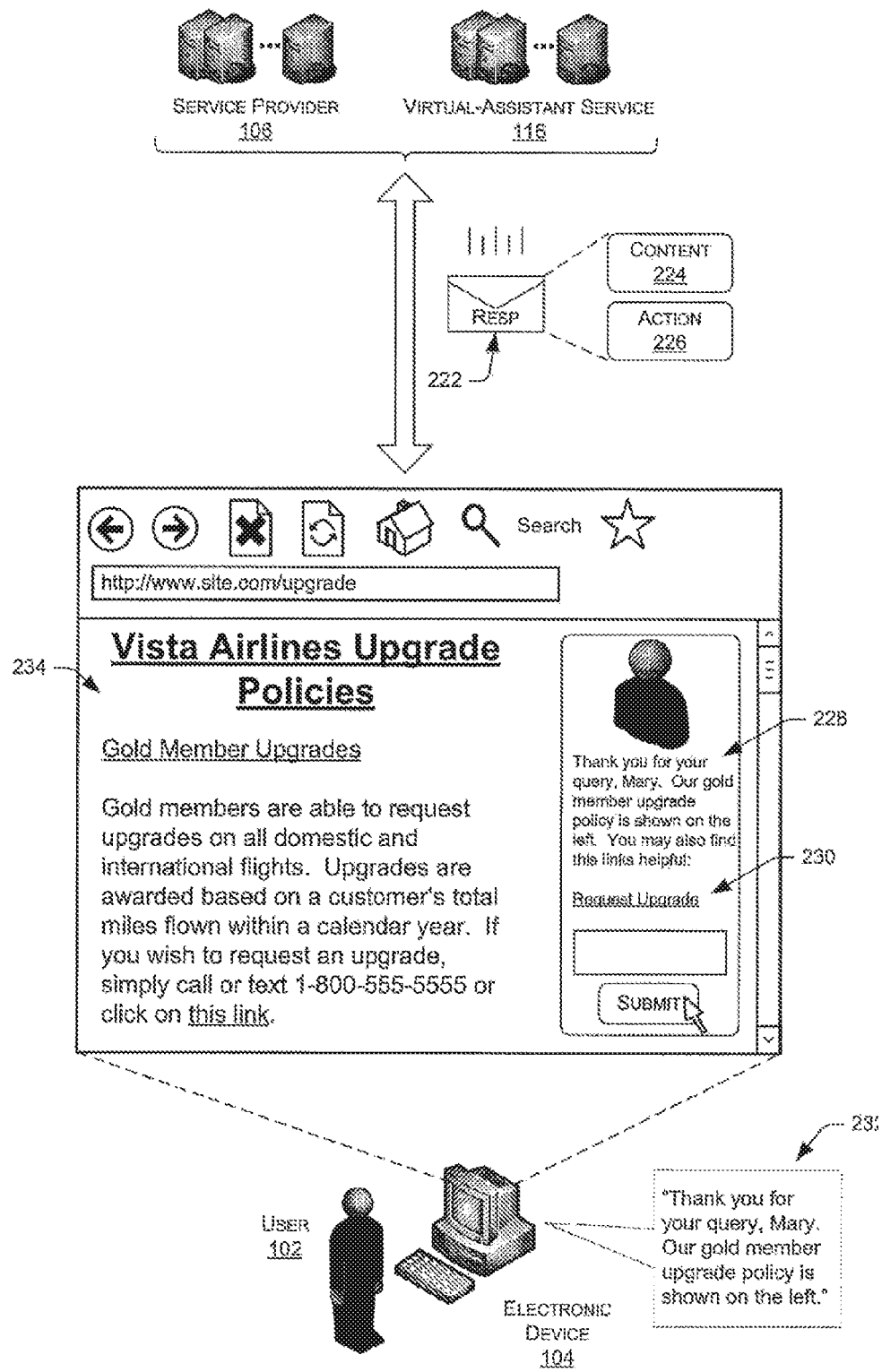
FIG. 5B illustrates a high-level communication flow between an electronic device of the user and the service provider and/or the virtual-assistant service.

FIGS. 5A-B collectively illustrate a high-level communication flow 500 between the example electronic device 104 of the user 102 and the service provider 106 and/or the virtual-assistant service 116. As illustrated, the electronic device 104 renders a user interface (UI) 202 that includes content 204 from the service provider 106 and content 206 from the virtual-assistant service 116. In some instances, the virtual-assistant service 116 serves the content 206 to the device 104, while in other instances the service provider 106 serves the content 206, either as part of the site content 204 or after receiving the content from a separate virtual-assistant service 116.

In either instance, the example content 204 here represents a home page of an example service provider ("Vista Airlines"). The content includes a title of the page, a link to current promotions, a link to book a flight, and the like. The content 206, meanwhile, collectively comprises a virtual assistant that is configured to emulate human-to-human interaction between the example user 102 and the service provider 106. In this example, the content 206 includes an avatar 208 that depicts a human representative of the service provider, as well as text 210 introducing the avatar 208 as a virtual assistant ("Hello, I'm Steve your virtual assistant. Please enter any question you have below").

The content 206 also includes an input mechanism, here in the form of a text box 212, in which the user 102 is able to enter a query to the virtual assistant. In this example, the user 102 has entered the query in the form of a string of text 214 ("Can I upgrade my seat assignment on my next flight?"). The user 102 may enter this query via a keyboard, audibly, or in any other manner. Finally, the example content 206 includes an icon 216 ("Submit") that, when selected, allows the user 102 to submit the query to the service provider 106 and/or the virtual-assistant service 116.

As illustrated, the user 102 has in fact selected the icon 216 to submit the entered query to the provider 106 and/or the service 116. In some instances, the device 104 provides the query 214 directly to the service provider 106, which identifies an appropriate response and may provide this response back to the device 104 or to another device associated with the user. In other instances, meanwhile, the provider 106 may receive the query 214, provide the query 214 to the service 116, receive a response from the service 116, and provide the response to the device 104 or to another device associated with the user. In still other instances, the device 104 provides the query 214 to the service 116 directly, which may identify a response or provide the query 214 to the provider 106 for identifying a response. The service 116 or the provider 106 may then provide the response to the device 104 or to another device associated with the user. Of course, while a few example communication flows have been described, it is to be appreciated that other communication flows are possible.

In each instance, the query 214 sent to the provider 106 and/or the service 116 may comprise one or more concepts 218 and one or more pieces of context 220. The concepts 218 may be based, in part, on the words and phrases within the string of text entered by the user, while the context 220 may be based on any additional factors associated with the user, the device 104, or the like. As described above, for instance, the context 220 may include whether or not the user is signed in with the service provider 106, a status of the user 102 with the service provider, an age of the user 102, a type of device from which the user 102 provides the query 214, or the like.

FIG. 5B continues the illustration and represents the service provider 106 and/or the virtual-assistant service 116 providing a response 222 for output on the electronic device 104 or on another electronic device associated with the user 102. As described above and in further detail below, the provider 106 and/or the service 116 may have identified the response by first mapping the concepts 218 and the context 220 to an intent, and thereafter mapping the intent and the context 220 to the response 222. As illustrated, the response 222 may comprise content 224, one or more actions 226 to perform, or a combination thereof.

FIG. 5B, for instance, illustrates that the response 222 includes text 228, a hyperlink 230, and audio content 232. The text 228 may comprise an answer or information otherwise pertaining to the user's query 214. Here, for example, the text 228 states the following: "Thank you for your query, Mary. Our gold member upgrade policy is shown on the left. You may also find this link helpful". As such, the provider 106 and/or the service 116 may have determined, via the context 220, that the user 102 was in fact signed with the service provider 106 when the user 102 submitted the query 214 and that the user 102 ("Mary") has a status of "gold member" with the service provider 106.

In addition, the response 222 included the link (e.g., a hyperlink) 230 associated with the query and entitled "Request Upgrade". When the user 102 selects the link 230, the electronic device 104 may navigate to a page at which the user 102 may request to upgrade her seat on her next flight. The audio content 232, meanwhile, may comprise the same content as the text 228, or may comprise different content in other examples. In some instances, the avatar (i.e., the visual representation of the virtual assistant) may appear to utter the audible content 232, either based on the tone of the content 232 and/or based on the avatar appearing to speak the words within the content 232.

In addition, the response 222 may include one or more actions 226 for performance on behalf of the user 102. Here, for instance, the response 222 has instructed the device 104 to navigate to a new page 234 of the site of the content provider, with this page being associated with the query 214. In this example, the page 234 indicates the service provider's policy for upgrading gold members, like the user 102. In other instances, the action 226 may comprise automatically upgrading the user's seat assignment, initiating a request to upgrade, or the like.

Figure 6A:
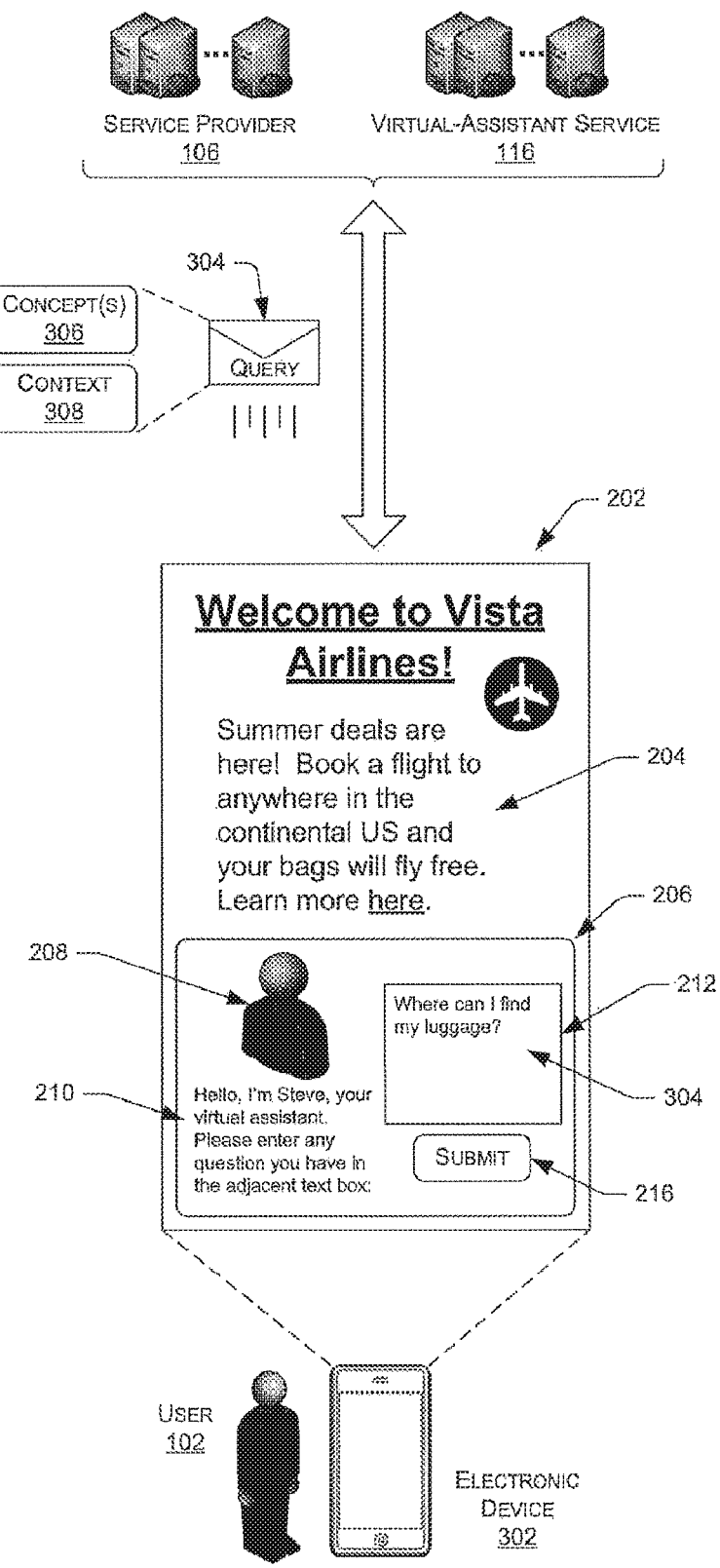
FIG. 6A illustrates another high-level communication flow between a mobile electronic device of the user and the service provider and/or the virtual-assistant service.
Figure 6B:
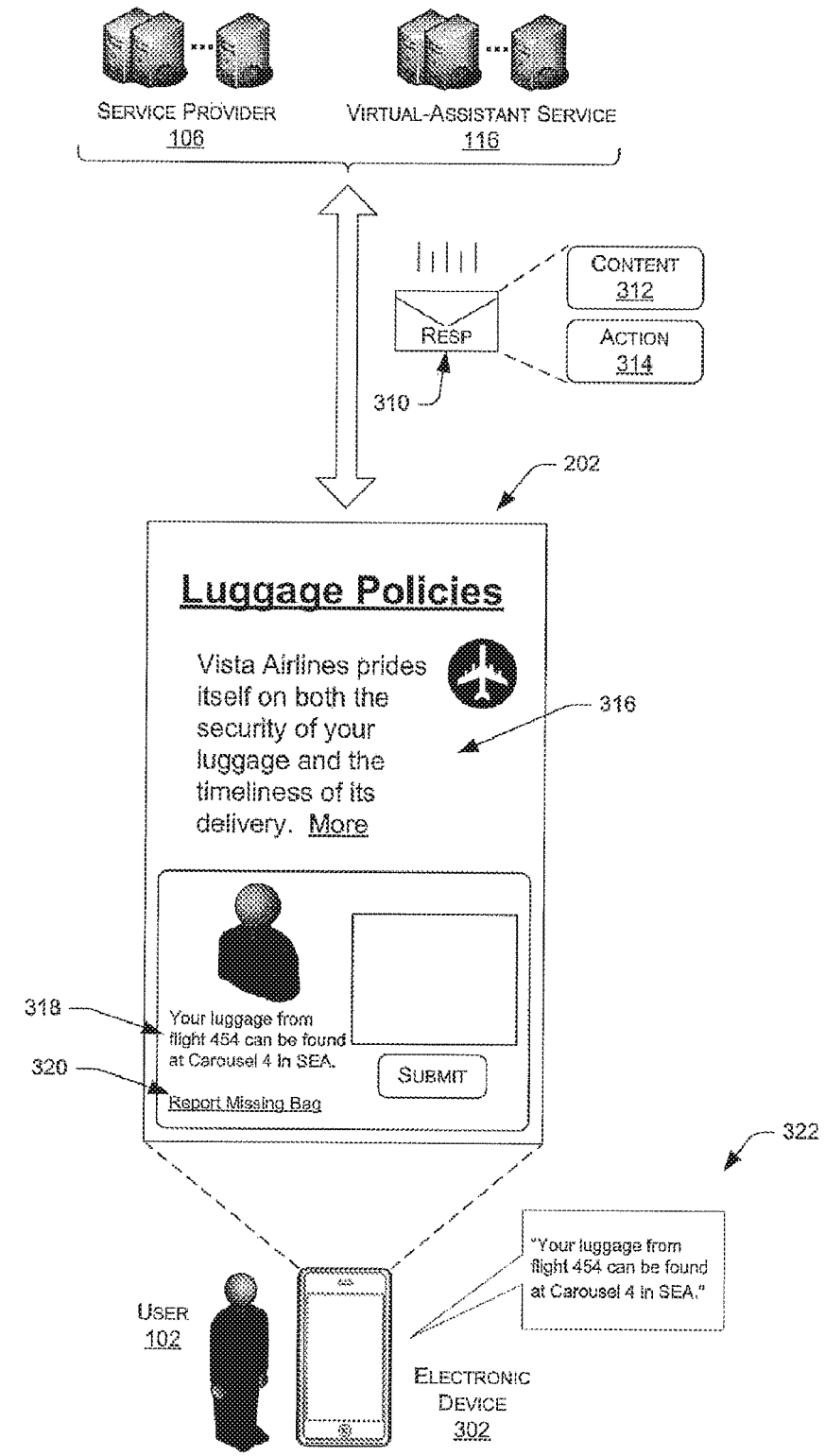
FIG. 6B illustrates another high-level communication flow between a mobile electronic device of the user and the service provider and/or the virtual-assistant service.

FIGS. 6A-B collectively illustrate another high-level communication flow 600 between a mobile electronic device 302 of the user 102 and the service provider 106 and/or the virtual-assistant service 116. Here, the user 102 again provides a query 304 via the virtual assistant, with the query including one or more concepts 306 and one or more pieces of context 308. In this example, the query comprises the string of text "Where can I find my luggage?". For instance, the user 102 may have recently deplaned from a flight on Vista airlines and, hence, may be providing the query 304 to the provider 106 and/or the service 116 while physically located near a particular airport. In another example, the user may be making this request from her home and prior to actually making the flight. In either instance, the query 304 may include this context in the form of the geolocation of the mobile electronic device 302 when the user issued the query. This geolocation may be provided explicitly by the device 302 (e.g., via GPS coordinates, etc.), may be determined via signal triangulation, or may be determined in any other manner.

FIG. 6B illustrates that, upon receiving the query 304, the service provider 106 and/or the virtual-assistant service 116 may identify a response 310 to provide to the user 102. Again, this response may be determined by identifying an intent of the query 304 with reference to the concepts 306 and one or more pieces of the context 308, and then by mapping the determined intent along with one or more same or different pieces of the context 308 to the response 310.

As with the example of FIGS. 5A-B above, the response 310 may comprise content 312 and/or action 314. In this example, the action 314 includes navigating the user's electronic device 302 to a page 316 of the service provider's site that indicates Vista Airlines' luggage policies. The content 312, meanwhile, includes text 318 indicating that the luggage of the user 102 can be found at carousel four at the airport at which the user 102 landed (SEA). To make this determination, the provider 106 and/or the service 116 may have identified the user 102, her now-completed travel plans, her geolocation, and/or one or more other pieces of context prior to serving the text 318 for output on the device 302. If the user were to have issued the query from her home and prior to her flight, the provider 106 and/or the service 116 may have taken this different context (e.g., a different geolocation, a different time of the query, etc.) into account and may have served different content.

In this example, the content 312 of the response 310 also includes a hyperlink 320 ("Report a Missing Bag") that is related to the query 304 of the user 102. Finally, in this example, the content 312 also includes audible content 322 for output by the virtual assistant. Again, while this audible content 322 is the same as the text 318 in this example, in other examples these pieces of content differ from one another.

Figure 7A:
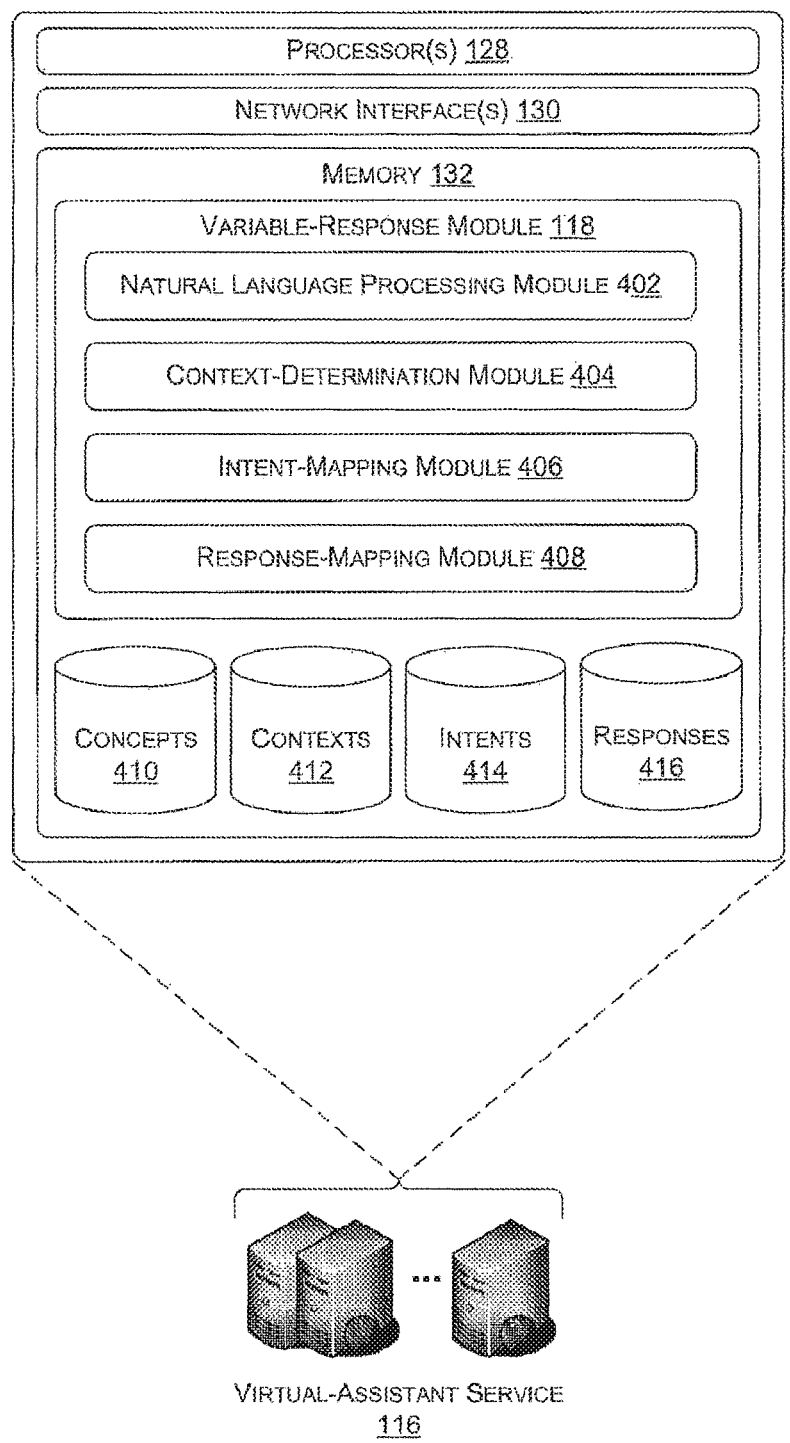
FIG. 7A illustrates example components that the virtual-assistant service of FIG. 1 may utilize when identifying a response to provide to a user query.
Figure 7B:
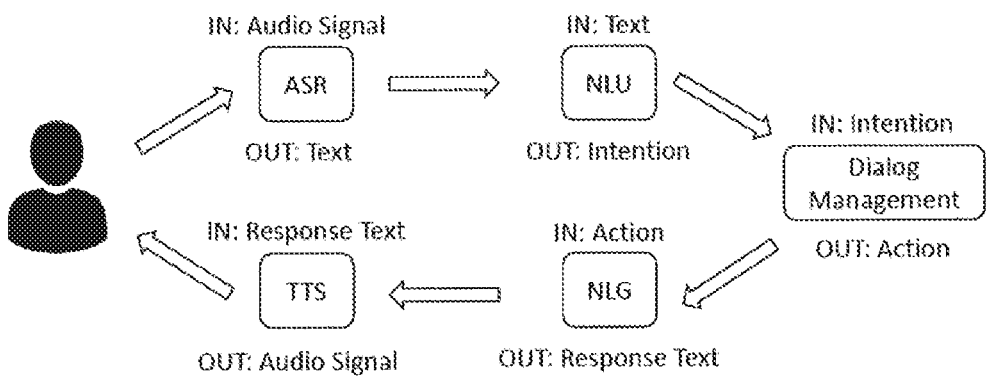
FIG. 7B is a schematic illustration of example data flow paths that the virtual-assistant service of FIG. 1 may utilize when identifying a response to provide to a user query.

FIG. 7A illustrates example components that the virtual-assistant service 116 may utilize when identifying a variable response to provide to a user's query. As illustrated, the service 116 may be hosted on one or more servers that include one or more processors 128, one or more network interfaces 130, and memory 132. FIG. 7B is a schematic illustration of example data flow paths that the virtual-assistant service of FIG. 1 may utilize when identifying a response to provide to a user query.

The memory 132 may store or otherwise have access to the variable-response module 118, which may include a natural language processing module 402, a context-determination module 404, an intent-mapping module 406, and a response-mapping module 408. In addition, the memory 132 may also store or otherwise have access to a datastore of one or more concepts 410, a datastore of one or more contexts 412, a datastore of one or more intents 414, and a datastore of one or more responses 416.

The natural language processing module 402 may implement known or new natural language processing techniques to parse a received query for the purpose of identifying one or more concepts expressed therein. For instance, the module 402 may identify a set of concepts 410 based on the string of text of the query. The context-determination module 404, meanwhile, may function to identify one or more pieces of context associated with the received query, such as whether the user is signed in, a geolocation of the user when issuing the query, or the like. The intent-mapping module 406 may then map the identified set of concepts and the identified pieces of context to one of the multiple different intents 414. That is, given the union of a particular concept set and respective values of one or more variables associated with the context of the query, the module 406 may map the query to a particular intent of the intents 414.

Finally, the response-mapping module 408 may map the intent to a particular response based at least in part on respective values of one or more variables, which may be the same or different variables used when mapping the query to an intent. Stated otherwise, and as illustrated below with reference to FIG. 8, each intent of the intents 414 may be associated with multiple different responses. Therefore, after a particular query has been mapped to a particular intent, the response-mapping module 408 may identify which of the multiple responses associated with the intent to provide to the user who provided the query, with reference to the context of the query.

While FIG. 7A illustrates the described components as residing on the virtual-assistant service 116, in other instances some or all of these components may reside in another location. For instance, these components may reside across the service 116, the service provider 106, the electronic device 104 or 302, or at any other location.

Figure 8:
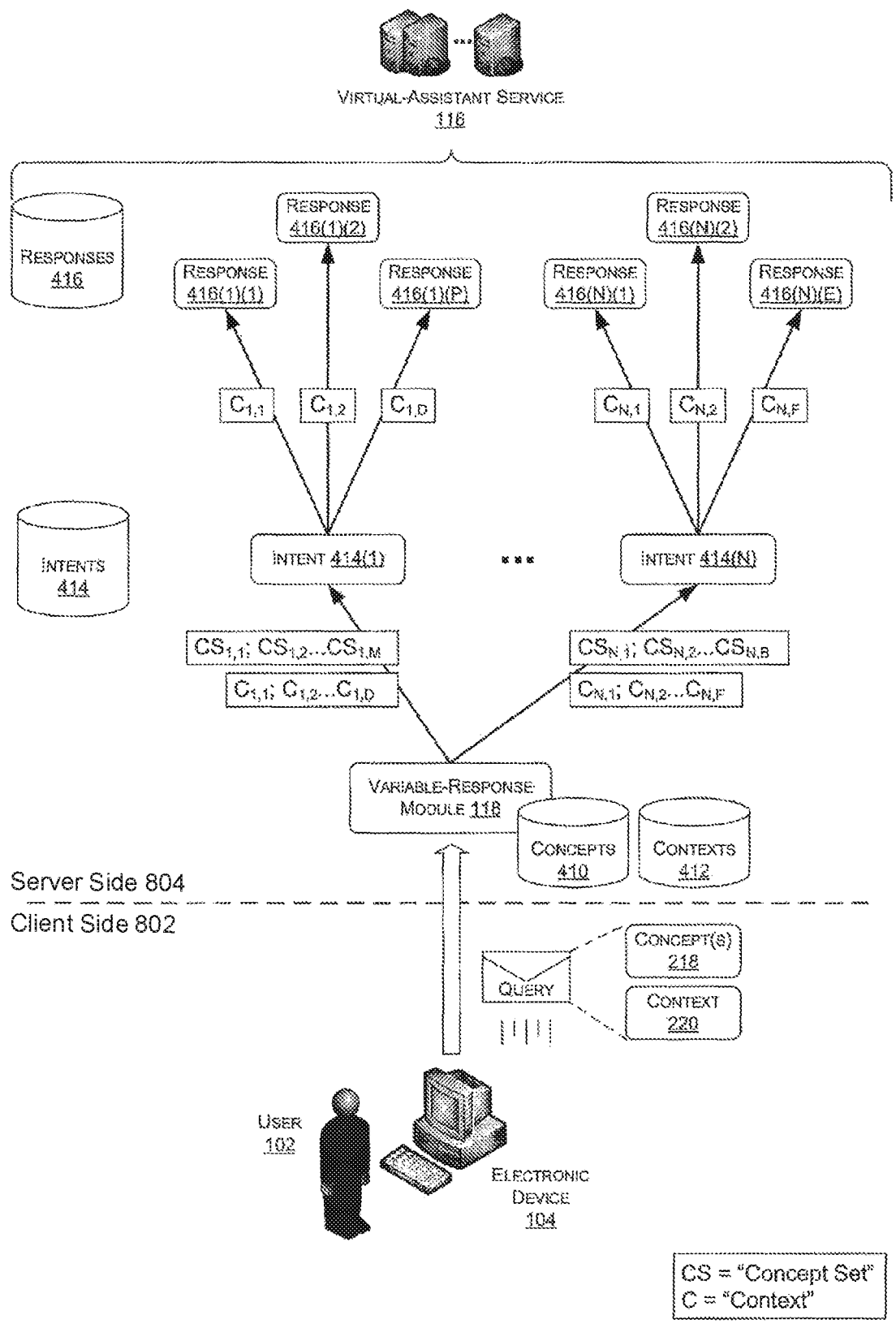
FIG. 8 illustrates how the virtual-assistant service may identify a response to provide to a user in response to receiving a query from the user via a virtual assistant.

FIG. 8 illustrates how the virtual-assistant service 116 may identify a response to provide to the example user 102 in response to receiving a query from the user 102 via a virtual assistant. In this example, the query is provided from the user on a client side 802 of the illustration, while the identifying of a response to provide to the query is illustrated as being performed on a server side 804 of the illustration. Of course, in other implementations different portions of the operations may be performed at other locations.

As FIG. 8 depicts, the example query again includes one or more concepts 218 and one or more pieces of context 220. Upon receiving the query, the variable-response module 118 may identify, potentially with reference to the datastores 410 and 412, the concepts and context of the query. Based on the identified set of concepts of the query (or "concept set") and the identified pieces of context of the query (or "context"), the module 118 may map the query to one of multiple different intents 414(1), . . . , 414(N). For instance, FIG. 8 illustrates that a query having a concept set "CS1,1" and a context "C1,1" maps to the intent 414(1), while a query having a concept set "CSN,1" and a content "C N,1" maps to the intent 414(N). In some instances, a concept set may map to more than one intent and, therefore, the context of the query may be used to determine which intent to map the query to. That is, in instances where a concept set of a query maps to multiple different intents, the intents may compete for the query based on the context of the query. As used herein, a letter (e.g., "N", "E", etc.) represents any integer that is greater than zero.

After mapping the query to an intent, the variable-response module 118 may then map the intent to an appropriate response 416(1)(1), . . . , 416(N)(E) with reference to the context of the query. For instance, for a query that the module 118 has mapped to the intent 414(1) and that has a content "C1,1", the module 118 maps this query to a response 416(1)(1). In some instances, of course, a response may be common (or utilized) across multiple different intents. After identifying the response based on the context, the virtual-assistant service 116 may then provide this response to the user 102, such as directly to the device 104 or to the service provider 106 for providing to the device 104 (and/or to another device associated with the user).

Figure 9A:
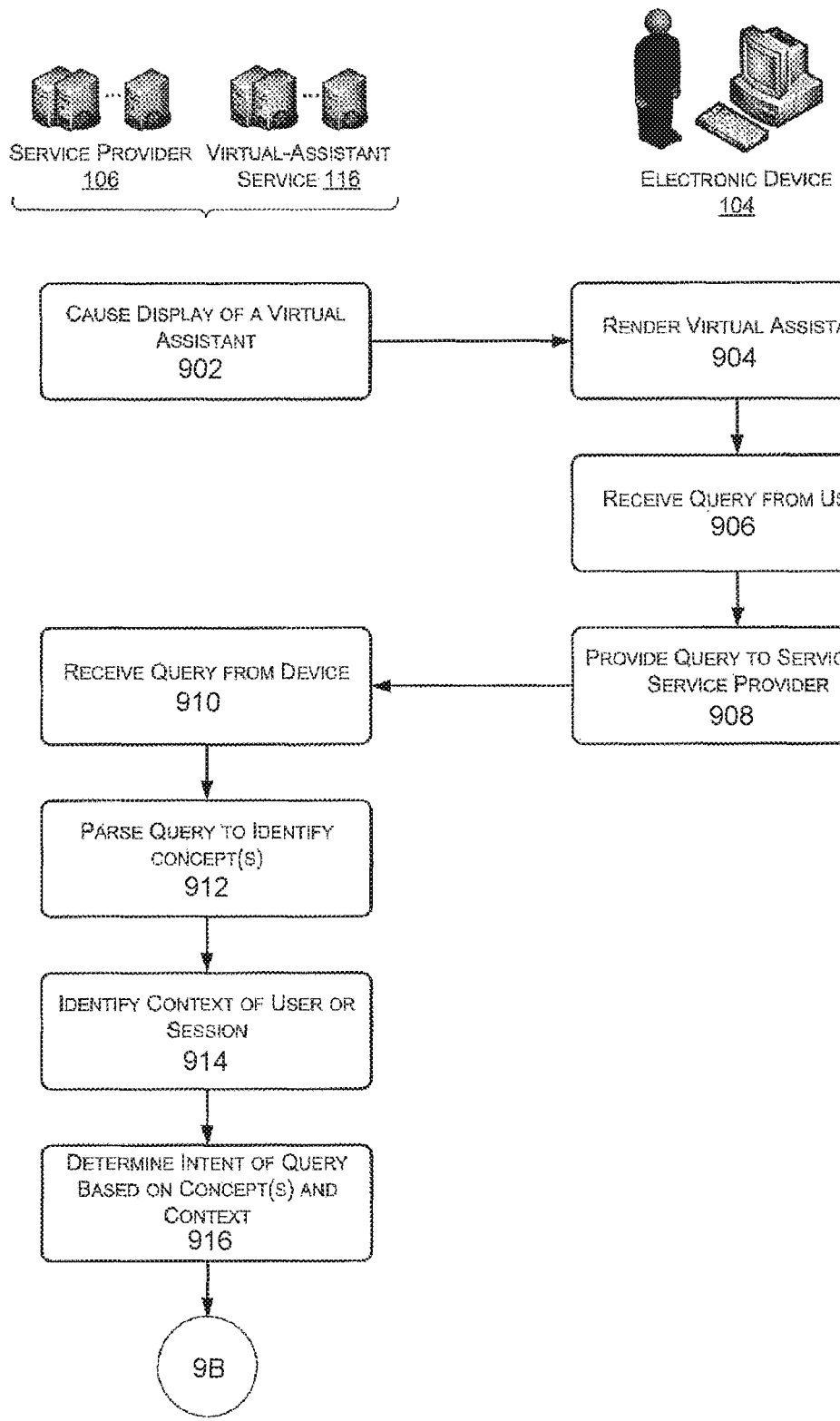
FIG. 9A illustrates an example process that includes a user providing a query via a virtual assistant and the service provider and/or the virtual-assistant service identifying a response to provide to the user.
Figure 9B:
FIG. 9B illustrates an example process that includes a user providing a query via a virtual assistant and the service provider and/or the virtual-assistant service identifying a response to provide to the user.
Figure 9B:
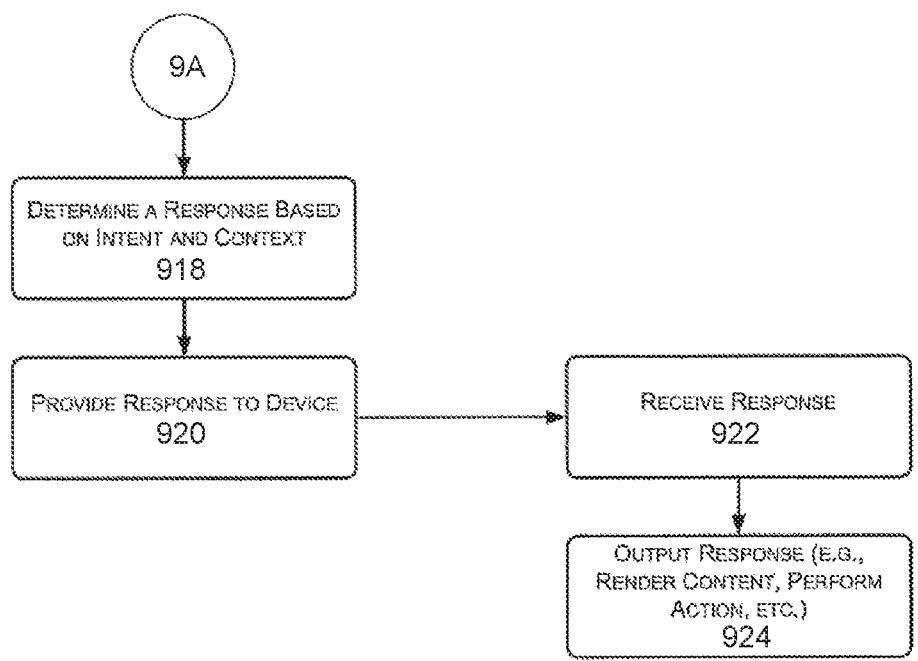

FIGS. 9A-B collectively illustrate an example process 900 that includes the example user 102 providing a query via a virtual assistant and the service provider 106 and/or the virtual-assistant service 116 identifying a response to provide to the user 102. Consistent with the discussion above, this response may take a context of the query into account both when identifying an intent of the query and when identifying an appropriate response. In this example, operations illustrated beneath the electronic device 104 may be performed by this device in some examples, while operations illustrated beneath the provider 106 and the service 116 may be performed by the provider and/or the service in some examples. However, it is to be appreciated that in other implementations the operations may be performed at any other location(s).

The process 900 (as well as each process described herein) is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

At 902, the service provider 106 and/or the virtual-assistant service 116 causes display of a virtual assistant on or adjacent to a site of service provider rendered on a display of the electronic device 104. At 904, and in response, the device 104 renders the virtual assistant on the display. At 906, the device 104 receives a query from the user, which may comprise a string of text. At 908, the device 104 provides this query to the provider 106 and/or the service 116, which receives the query at 910.

At 912, the provider 106 and/or the service 116 parses the query to identify one or more concepts expressed therein. That is, the provider 106 and/or the service 116 may use natural language processing techniques to identify concepts specified by the user in the query. These concepts may be determined with reference to contents of the user's query in any suitable manner. In some examples, the concept(s) of a query are determined at least partly with reference to one or more keywords expressed within the query. For instance, the concepts may be determined using relatively basic keyword matching in some instances. In other instances, meanwhile, the concepts may be determined using a much richer process as described below.

In these instances, when the provider 106 and/or the service 116 receives the query in the form of a string of text, the provider 106 and/or the service 116 preprocesses the string by, for example, identifying one or more tokens within the string. The tokens may comprise words, phrases, symbols, or the like that signify some sort of meaning within the query. After tokenizing the string of text, the provider 106 and/or the service 116 may then map each of these tokens and/or ordered patterns of the tokens to a more general set, known as a "vocab item". A vocab item may comprise a general set of multiple different tokens having a meaning that is common amongst these tokens. For instance, the tokens "happy", "elated" and a smiley face (e.g., ":-)") may each map to a vocab item representing "happiness".

After mapping tokens and/or patterns of tokens from the original string of text to one or more vocab items, the provider 106 and/or the service 116 may then pattern match the vocab items to one or more concepts. That is, each concept may be associated with multiple different vocab-item patterns (e.g., "(vocab item A, vocab item, D, vocab item F)", "(vocab item B, vocab item E)", "(vocab item X)", etc.). In addition, some of these patterns may be associated with a context. For instance, the pattern "(vocab item B, vocab item E)" may map to a particular concept given a particular context (e.g., the user is a Gold Member), but not otherwise. By pattern matching the vocab items to the concepts, the provider 106 and/or the service 116 may identify one or more concepts that are associated with the submitted query.

In addition or in the alternative to the techniques described above, the provider 106 and/or the service 116 may identify concept(s) of a query with reference to a graph data structure that maintains correlations between words. The graph data structure, for instance, may maintain a hierarchy of words (e.g., hypernyms and hyponyms). The techniques may utilize this hierarchy to identify one or more concepts within a string of text. For instance, if a string contains the word "cookbook", the techniques may analyze the graph data structure to determine that "cookbook" is a type of a "reference book" which is a type of "book". The techniques may then identify "book", "reference book", and/or "book" as a concept within the query. Of course, in this and other processes used to determine concepts within queries, the techniques may reference other factors associated with the queries, such as the ordering of words, parts of speech of words, and the like. Furthermore, while a few different example techniques for identifying concepts have been described, it is to be appreciated that other new and/or known techniques may be used to identify concepts within a query.

At 914, the provider 106 and/or the service 116 may also identify a context associated with the user 102 or with a session of the user 102 on the site of the service provider 106. This may include whether the user is logged in on the site, a page from which the user submitted the query, a status of the user at the service provider 106, or the like. At 916, the provider 106 and/or the service 116 then determines an intent of the query based on the identified concept(s) and the identified context.

FIG. 9B continues the illustration of the process 900 and includes, at 918, the provider 106 and/or the service 116 determining a response to provide to the query based on the intent and the identified context. In some instances, the portion of the context referenced in mapping the query to the intent represents the same portion of context referenced in mapping the intent to the response. In other instances, meanwhile, the provider 106 and/or the service 116 map the query to an intent using a first portion of context, while using a second, different portion of the context when mapping the intent to the response. Of course, in still other instances, these portions of content may include at least one common piece of context and at least one piece of context that is not commonly used.

At 920, the provider 106 and/or the service 116 provides the response to the electronic device 104 of the user or to another electronic device associated with the user. In this example, the device 104 receives the response at 922 and, at 924, outputs the response to the user 102, at least a portion of which may be outputted via the virtual assistant. For instance, the device 104 may render text, one or more links, audible content, and the like, and may perform one or more actions specified in the response.

Figure 10:
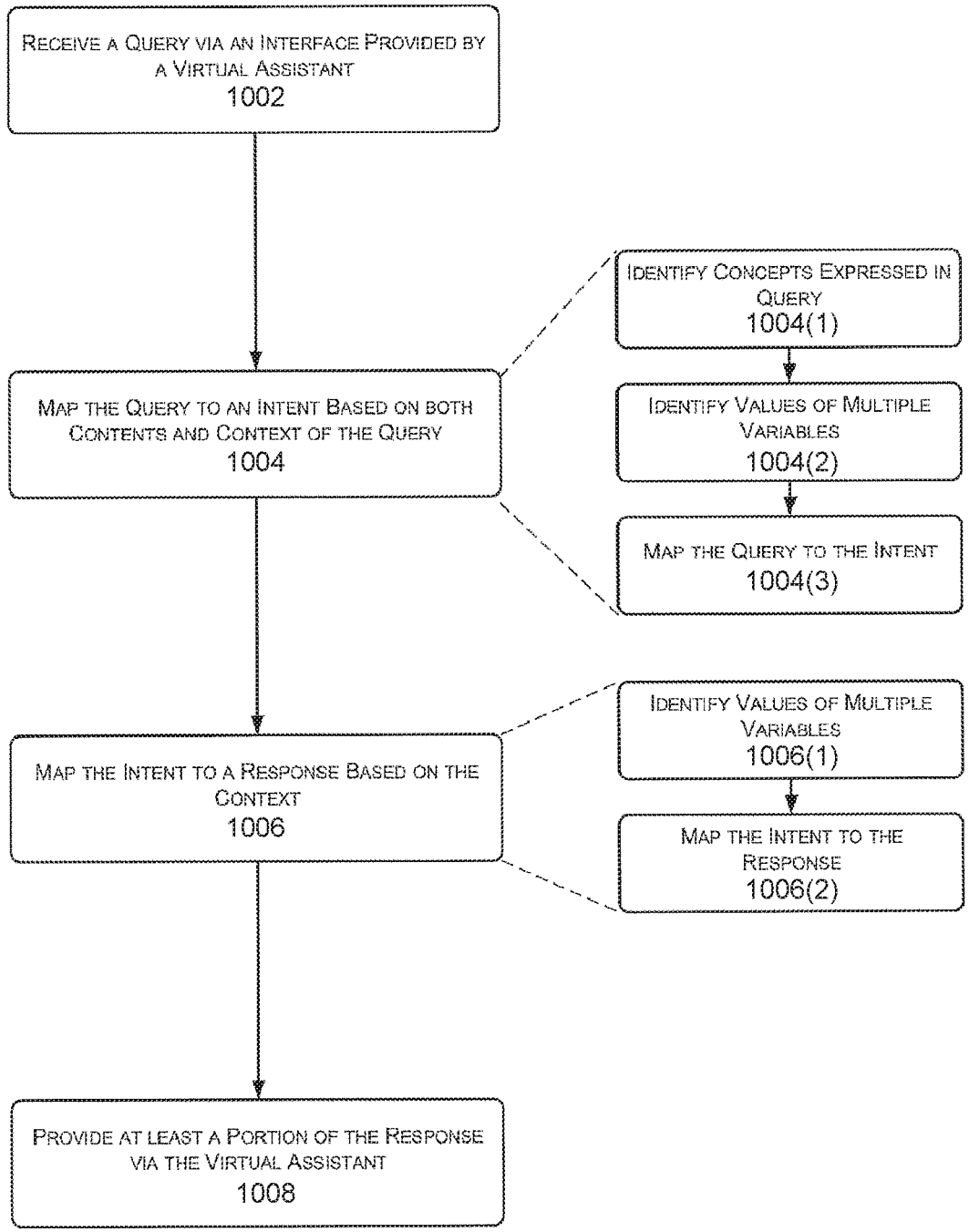
FIG. 10 illustrates additional example flow diagrams for providing responses to user queries via virtual assistants.

FIG. 10 illustrates another process 1000 for providing variable responses to user queries via virtual assistants. This process may be performed by the virtual-assistant service 116, the service provider 106, the electronic device 104 of the user, and/or some combination thereof. At 1002, the process 1000 receives a query via an interface provided by a virtual assistant. At 1004, the process 1000 then maps the query to an intent based on both contents of the query and a context of the query.

In some instances, the operation 1004 may comprise a series of sub-operations. At 1004(1), the process 1000 identifies one or more concepts expressed in the query. At 1004(2), the process identifies respective values of multiple different variables that may collectively define the context of the query. Finally, at 1004(3), the process 1000 maps the query to the intent with reference to the concepts and the values of the multiple variables.

At 1006, the process 1000 then maps the intent to a response based on the context of the query. The operation 1006 may include a series of sub-operations that include, at 1006(1), the process 1000 identifying values of multiple variables, which may be the same and/or different from the variables used in mapping the query to the intent at 1004(3). At 1006(2), the process 1000 then maps the intent to the response based at least in part on the values of the variables identified at 1006(1). Finally, at 1008, the process 1000 may provide at least a portion of the response to the user via the virtual assistant.

FIG. 11 shows an exemplary computing environment in which example embodiments and aspects may be implemented. The computing device environment is only one example of a suitable computing environment and is not intended to suggest any limitation as to the scope of use or functionality.

Numerous other general purpose or special purpose computing devices environments or configurations may be used. Examples of well-known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 11, an exemplary system for implementing aspects described herein includes a computing device, such as computing device 1100. In its most basic configuration, computing device 1100 typically includes at least one processing unit 1102 and memory 1104. Depending on the exact configuration and type of computing device, memory 1104 may be volatile (such as random access memory (RAM)), non-volatile (such as read-only memory (ROM), flash memory, etc.), or some combination of the two. This most basic configuration is illustrated in FIG. 11 by dashed line 1106.

Computing device 1100 may have additional features/ functionality. For example, computing device 1100 may include additional storage (removable and/or non-removable) including, but not limited to, magnetic or optical disks or tape. Such additional storage is illustrated in FIG. 11 by removable storage 1108 and non-removable storage 1110.

Computing device 1100 typically includes a variety of computer readable media. Computer readable media can be any available media that can be accessed by the device 900 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 1104, removable storage 1108, and non-removable storage 1110 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1100. Any such computer storage media may be part of computing device 1100.

Computing device 1100 may contain communication connection(s) 1112 that allow the device to communicate with other devices. Computing device 1100 may also have input device(s) 1114 such as a keyboard, mouse, pen, voice input device, touch input device, etc. Output device(s) 1116 such as a display, speakers, printer, etc. may also be included. All these devices are well known in the art and need not be discussed at length here.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

In an implementation, a system for identifying relational segments is provided. The system includes a computing device at a service provider configured to receive input from a user device of a user while the user is engaged in a session on a site of the service provider, determine a secondary intent of the input, classify the second intent into at least one category of relational language, and generate a response based on the secondary intent; and a virtual-assistant configured to interact with the user.

Implementations may include some or all of the following features. The virtual-assistant is configured to be displayed on or adjacent to the site of a service provider. The computing device at the service provider is further configured to determine a primary intent of the input. Determining the secondary intent of the input uses at least one of audio, an emoji, or sentiment shift. The input comprises audio features. The computing device at the service provider is configured to extract pitch, energy, and frequency features from the input to detect emotions in the audio features. The input comprises textual features. The input comprises a query from the user. The query comprises a fixed word or phrase. The virtual-assistant is further configured to provide at least a portion of the response to the user.

In an implementation, a method for identifying relational segments is provided. The method may include receiving input at a computing device of a service provider from a user device of a user while the user is engaged in a session on a site of a service provider; determining a secondary intent of the input; classifying the second intent into at least one category of relational language; and generating a response based on the secondary intent.

Implementations may include some or all of the following features. The method further comprises taking action based on the secondary intent. The method further comprises determining a primary intent of the input. Determining the secondary intent of the input uses at least one of audio, an emoji, or sentiment shift. The input comprises audio features. The method further comprises extracting pitch, energy, and frequency features from the input to detect emotions in the audio features. The input comprises textual features. The input comprises a query from the user. The query comprises a fixed word or phrase. The method further comprises providing at least a portion of the response to the user.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system comprising:
a computing device at a service provider configured to:
cause display of a virtual assistant on or adjacent to a website of the service provider,
receive input, comprising a query, from a user device of a user through the virtual assistant while the user is engaged in a session on the website of the service provider,
wherein the input comprises a plurality of segments,
detect relational language in a first subset of the plurality of segments and not in a second subset of the plurality of segments by:
segmenting the input based on punctuation symbols and conjunctions,
generating a set of hypothesis pairs based on the segmented inputs,
generating a respective confidence score for each hypothesis pair using an intent classifier, and
determining that (i) at least a first confidence score associated with the first subset of the plurality of segments does not meet or exceed a confidence threshold corresponding with an intent and (ii) at least a second confidence score associated with the second subset of the plurality of segments meets or exceeds the confidence threshold;
determine, based at least on the detected relational language, that a plurality of intents are present in the input,
determine a primary intent of the input using segments only from the second subset and a secondary intent of the input using segments from the first subset responsive to the determining that the plurality of intents are present in the input;
classify the secondary intent into at least one category using the relational language;
generate a response to the query based on the primary intent, the secondary intent and the at least one category using the relational language, and provide the response to the virtual assistant, wherein the response includes content and at least one action; and
the virtual assistant configured to interact with the user and provide to the user the content via the user device and to perform the at least one action, wherein the at least one action comprises the virtual assistant navigating the user device to a webpage that is responsive to the query.

2. The system of claim 1, wherein the primary intent is a task and the secondary intent is a sentiment.

3. The system of claim 1, wherein determining the secondary intent of the input uses at least one of audio, an emoji, or sentiment shift.

4. The system of claim 1, wherein the input comprises audio features.

5. The system of claim 4, wherein the computing device at the service provider is configured to extract pitch, energy, and frequency features from the input to detect emotions in the audio features.

6. The system of claim 1, wherein the input comprises textual features.

7. The system of claim 1, wherein the query comprises a fixed word or phrase.

8. A method comprising:
  causing display of a virtual assistant on or adjacent to a website of a service provider;
  receiving input, comprising a query, at a computing device of the service provider from a user device of a user through the virtual assistant while the user is engaged in a session on the website of the service provider, wherein the input comprises a plurality of segments;
  detecting relational language in a first subset of the plurality of segments and not in a second subset of the plurality of segments by:
    segmenting the input based on punctuation symbols and conjunctions,
    generating a set of hypothesis pairs based on the segmented inputs,
    generating a respective confidence score for each hypothesis pair using an intent classifier, and
    determining that (i) at least a first confidence score associated with the first subset of the plurality of segments does not meet or exceed a confidence threshold corresponding with an intent, and (ii) at least a second confidence score associated with the second subset of the plurality of segments meets or exceeds the confidence threshold;
  determining, based at least on the detected relational language, that a plurality of intents are present in the input;
  determining a primary intent of the input using segments only from the second subset and a secondary intent of the input using segments from the first subset responsive to the determining that the plurality of intents are present in the input;
  classifying the secondary intent into at least one category using the relational language;
  generating a response to the query based on the primary intent, the secondary intent, and the at least one category using the relational language, and providing the response to the virtual assistant, wherein the response includes content and at least one action; and
  providing to the user, from the virtual assistant, the response to the query via the user device, and performing the at least one action, wherein the at least one action comprises the virtual assistant navigating the user device to a webpage that is responsive to the query.

9. The method of claim 8, further comprising taking action based on the secondary intent.

10. The method of claim 8, wherein determining the secondary intent of the input uses at least one of audio, an emoji, or sentiment shift.

11. The method of claim 8, wherein the input comprises audio features.

12. The method of claim 11, further comprising extracting pitch, energy, and frequency features from the input to detect emotions in the audio features.

13. The method of claim 8, wherein the input comprises textual features.

14. The method of claim 8, wherein the query comprises a fixed word or phrase.

15. A non-transitory computer-readable medium storing instructions that when executed by at least one computing device of a system, cause the system to:
  cause display of a virtual assistant on or adjacent to a website of a service provider,
  receive input, comprising a query, from a user device of a user through the virtual assistant while the user is engaged in a session on the website of the service provider, wherein the input comprises a plurality of segments,
  detect relational language in a first subset of the plurality of segments and not in a second subset of the plurality of segments by:
    segmenting the input based on punctuation symbols and conjunctions,
    generating a set of hypothesis pairs based on the segmented inputs,
    generating a respective confidence score for each hypothesis pair using an intent classifier, and
    determining that (i) at least a first confidence score associated with the first subset of the plurality of segments does not meet or exceed a confidence threshold corresponding with an intent, and (ii) at least a second confidence score associated with the second subset of the plurality of segments meets or exceeds the confidence threshold;
  determine, based at least on the detected relational language, that a plurality of intents are present in the input,
  determine a primary intent of the input using segments only from the second subset and a secondary intent of the input using segments from the first subset responsive to the determining that the plurality of intents are present in the input,
  classify the secondary intent into at least one category using the relational language, and
  generate a response to the query based on the primary intent, the secondary intent and the at least one category using the relational language, and provide the response to the virtual assistant, wherein the response includes content and at least one action; and
  the virtual assistant configured to interact with the user and provide to the user the content via the user device and to perform the at least one action, wherein the at least one action comprises the virtual assistant navigating the user device to a webpage that is responsive to the query.

16. The non-transitory computer-readable medium of claim 15, wherein the primary intent is a task and the secondary intent is a sentiment.

17. The non-transitory computer-readable medium of claim 15, wherein the secondary intent of the input is determined using at least one of audio, an emoji, or sentiment shift.

18. The non-transitory computer-readable medium of claim 15, wherein the input comprises audio features.

19. The non-transitory computer-readable medium of claim 18, further comprising instructions that when executed by the at least one computing device of the system, cause the system to: extract pitch, energy, and frequency features from the input to detect emotions in the audio features.

20. The non-transitory computer-readable medium of claim 15, wherein the input comprises textual features.

\* \* \* \* \*